(12) United States Patent
Kuze et al.

(10) Patent No.: US 8,098,556 B2
(45) Date of Patent: Jan. 17, 2012

(54) OPTICAL DISC DEVICE

(75) Inventors: Yuuichi Kuze, Osaka (JP); Katsuya Watanabe, Nara (JP); Shinichi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 347 days.

(21) Appl. No.: 12/297,483

(22) PCT Filed: Apr. 20, 2007

(86) PCT No.: PCT/JP2007/058601
§ 371 (c)(1),
(2), (4) Date: Oct. 17, 2008

(87) PCT Pub. No.: WO2007/123192
PCT Pub. Date: Nov. 1, 2007

(65) Prior Publication Data
US 2009/0109812 A1 Apr. 30, 2009

(30) Foreign Application Priority Data
Apr. 21, 2006 (JP) .................................. 2006-117595

(51) Int. Cl.
| G11B 15/62 | (2006.01) |
| G11B 17/32 | (2006.01) |
| G11B 20/20 | (2006.01) |
| G11B 27/10 | (2006.01) |
| G11B 20/10 | (2006.01) |

(52) U.S. Cl. .................. 369/53.19; 369/47.32; 369/47.4
(58) Field of Classification Search ................ 369/44.32, 369/53.19, 53.14, 53.12, 47.36, 47.38–47.48
See application file for complete search history.

(56) References Cited

U.S. PATENT DOCUMENTS
7,054,241 B2   5/2006 Kondo et al.
(Continued)

FOREIGN PATENT DOCUMENTS
JP   2003-281761   10/2003
(Continued)

OTHER PUBLICATIONS
International Search Report for corresponding Application No. PCT/JP2007/058601 mailed Jul. 24, 2007.
(Continued)

*Primary Examiner* — Joseph Haley
*Assistant Examiner* — Nicholas Lee
(74) *Attorney, Agent, or Firm* — Renner, Otto, Boisselle & Sklar, LLP

(57) ABSTRACT

An object of this invention is to measure the tilt quantity of, and perform a tilt control on, an optical disc accurately without depending on the rotation control method.
An optical disc drive includes: a motor for rotating an optical disc; an optical system for irradiating the optical disc with a light beam; a moving mechanism for moving the optical system along the radius of the optical disc; a focus control section for controlling movement of the optical system perpendicularly to the optical disc based on drive values, thereby focusing the light beam onto a storage layer of the optical disc; and a tilt control section for measuring the tilt quantities of the storage layer at multiple different radial locations on the optical disc based on drive values for the respective radial locations when the focus control section focuses the light beam there. When the tilt control section measures the tilt quantities, the motor keeps the rotational frequency of the optical disc constant and the tilt control section uses the drive values obtained at the respective radial locations.

13 Claims, 15 Drawing Sheets

U.S. PATENT DOCUMENTS

| | | |
|---|---|---|
| 7,187,636 B2 | 3/2007 | Kato et al. |
| 7,450,479 B2 * | 11/2008 | Toyoda ........................ 369/47.44 |
| 2004/0085868 A1 * | 5/2004 | Ohno et al. .................. 369/44.32 |
| 2005/0168929 A1 * | 8/2005 | Inoue et al. ..................... 361/683 |
| 2005/0243672 A1 * | 11/2005 | Arakawa ..................... 369/53.19 |
| 2006/0002253 A1 | 1/2006 | Ishihara |

FOREIGN PATENT DOCUMENTS

| | | |
|---|---|---|
| JP | 2004-095035 | 3/2004 |
| JP | 2005-317146 | 11/2005 |
| JP | 2006-018884 | 1/2006 |
| JP | 2006-040468 | 2/2006 |
| JP | 2006-179037 | 7/2006 |

OTHER PUBLICATIONS

Form PCT/ISA/237 and a partial English translation mailed Jul. 24, 2007.

* cited by examiner (a)

(b)

(a) When Drive Is Started Up Before Reading (b) Before Writing (a) During Writing (b) Before Writing (a)

(b)

(a)

(b)

(a)

(b)

OPTICAL DISC DEVICE

TECHNICAL FIELD

The present invention relates to an optical disc drive for reading and/or writing information from/on a storage medium (such as an optical disc) using a light beam. More particularly, the present invention relates to a technique for significantly reducing the overall radial tilt quantity to measure on a multi-layer storage medium by measuring the radial tilt of such a storage medium with high accuracy.

BACKGROUND ART

When an optical disc drive writes information on a recordable optical disc or reads information that is stored there, the light beam needs to always have a predetermined focusing state on a target track on its storage layer. For that purpose, "focus control" and "tracking control" need to be done. The focus control means controlling the position of an objective lens perpendicularly to the storage layer such that the focal point of the light beam is always located right on the storage layer. On the other hand, the "tracking control" means controlling the position of the objective lens along the radius of the optical disc such that the focal point of the light beam is on a predetermined track.

The optical disc drive further needs "tilt control", which means either controlling the angle of an optical pickup such that the optical axis of the light beam is perpendicular to the storage layer of the optical disc or controlling the angle of the objective lens such that the magnitude of coma aberration to produce at the focal point of the light beam becomes substantially equal to zero (e.g., within 14 m$\lambda$).

Supposing a situation where a light beam is incident on an optical disc with its optical axis forming right angles with the storage layer of the optical disc is a reference state, the difference of the actual angle formed by the optical axis with respect to the storage layer from the right angles is called a "tilt angle". The tilt control is done to keep the magnitude of a coma aberration, which is produced at the focal point of the light beam as being affected by this tilt angle, substantially equal to zero (e.g., within 14 m$\lambda$). A state in which the magnitude of coma aberration is not equal to zero will be referred to herein as a "tilted state".

As used herein, a "disc tilt" is defined to be a tilt caused by an upward or downward deformation of a disc and a "lens tilt" is defined to be a tilt caused by an inclination of an objective lens.

The control of changing the angles of the objective lens described above is a method of reducing the total tilt quantity to zero by offsetting a disc tilt by a lens tilt. According to another method, the tilt may also be controlled by varying the phase of the light beam using a liquid crystal display device, for example.

As the storage density of a storage layer in an optical disc increases, it has become more and more important to perform a tilt control precisely enough to avoid causing tilts. This is because once a tilt has been caused, the quality of a written signal or the jitter of a read signal will deteriorate too significantly to keep the performance of the optical disc drive good enough.

FIGS. 12(a) and 12(b) schematically show cross sections of a light beam on the storage layer of an optical disc in a situation where no tilt has been caused and in a situation where a tilt has been caused, respectively. Meanwhile, FIGS. 13(a) and 13(b) show how the jitter of a read signal changes with the tilt quantity (which is typically represented by the tilt angle) and how the error rate changes with the tilt quantity. As shown in FIGS. 12 and 13, the tilt produces a coma aberration, thus deteriorating the jitter and increasing the error rate in the read signal.

If the aberration produced by the tilt exceeded its tolerance (e.g., approximately 0.3 degrees for DVDs), information could no longer be read or written in the best condition, thus decreasing the reliability of the information, which would be a problem. Also, the tolerance range of the aberration with respect to the tilt angle is inversely proportional to the third power of the numerical aperture (NA). That is why the higher the storage density of an optical disc, the narrower the tolerance range and the more difficult it would be to keep the read/write performance of the drive good enough. This is because to increase the storage density, the beam spot size of the light beam should be decreased. For that purpose, the light beam should have its wavelength shortened and its numerical aperture (NA) increased.

To realize good read/write performance on high-density optical discs, the optical disc drive disclosed in Patent Document No. 1 adopts not only mechanical positioning control on an optical system and a drive system but also a tilt control for appropriately tilting either an optical head or an objective lens. During the tilt control, the optical disc drive measures the magnitudes of focus drive at two different radial locations to detect the tilt angle caused by the upward or downward deformation of the disc or a misalignment of the mechanical chassis. And the optical disc drive corrects the tilt angle detected and reduces it to as close to zero as possible, thereby realizing read and write operations in an appropriate condition.

Patent Document No. 1: Japanese Patent Application Laid-Open Publication No. 2003-281761

DISCLOSURE OF INVENTION

Problems to be Solved by the Invention

In the prior art, however, if the disc motor is controlled by the constant linear velocity (CLV) technique, the disc tilt quantity of the optical disc will be calculated with a significant error.

It is known that when an optical disc rotates, the disc will be deformed either upward or downward due to the influence of a gas flow or centrifugal force that has been caused by the rotation. FIGS. 14(a) and 14(b) show the direction in which the centrifugal force is produced and the deformation directions of the optical disc due to the centrifugal force when an upwardly deformed disc is rotated and when a downwardly deformed disc is rotated, respectively. The degree of deformation of the optical disc depends on the rotational frequency thereof.

In the CLV control, an optical disc has variable rotational frequencies at different radial locations. This CLV control is carried out when information is written, for example. The CLV control is also carried out when the disc tilt quantity is detected by measuring the distance between the package of the optical pickup and the optical disc at two different radial locations on the disc. Since the optical disc has mutually different rotational frequencies at the respective locations, the shapes of the optical disc are subject to change due to the gas flow or centrifugal force when measurements are done at those locations. In that case, the distances measured between the respective locations and the optical pickup will be affected by the variation in the height of the storage layer of the optical disc that has been produced by the deformation of the optical disc, thus causing a significant error in the tilt quantity calculated.

Hereinafter, this phenomenon will be described in further detail with reference to FIG. 15.

FIG. 15 schematically shows how an optical disc changes its shapes with the rotational frequency. In FIG. 15, the ordinate represents the position (FC position) of the storage layer in the optical disc, which may be a distance from the objective lens (not shown) of the optical pickup to the storage layer of the optical disc, for example, while the abscissa represents the radial location on the optical disc.

If the optical disc has a rotational frequency A, the storage layer of the optical disc is deformed as indicated by the graph "Shape s". In this case, a storage layer locational a1 a radius r1 has an FC position fa1, a storage layer location a2 at a radius r2 has an FC position fa2, and the tilt quantity θa between the radii r1 and r2 is given by $$\theta a = \arctan((fa2-fa1)/(r2-r1))$$

On the other hand, if the optical disc has a rotational frequency B (where A<B), the storage layer of the optical disc is deformed as indicated by the graph "Shape t". In this case, a storage layer location b1 at the radius r1 has an FC position fb1, a storage layer location b2 at the radius r2 has an FC position fb2, and the tilt quantity θb between the radii r1 and r2 is given by $$\theta b = \arctan((fb2-fb1)/(r2-r1))$$

If the interval between the radii r1 and r2 is sufficiently small for the variation in the shape of the disc, then fa2−fa1=fb2−fb1 will be satisfied. In that case, the tilt quantity θa will be approximately equal to the tilt quantity θb.

In this example, the optical disc has the rotational frequency A when the focal point of the light beam is located at the radius r1 on the storage layer of the optical disc during the CLV control. On the other hand, the optical disc has the rotational frequency B when the focal point of the light beam is located at the radius r2 on the storage layer of the optical disc.

According to the technique disclosed in Patent Document No. 1 described above, the FC position when the light beam is focused at the radius r1 is fa1 in the shape s but the FC position when the light beam is focused at the radius r2 is fb2 in the shape t. As a result, the tilt quantity θ is calculated as:

$$\theta = \arctan((fb2-fa1)/(r2-r1))$$

However, considering fb2>fa2 and b1>fa1, θa, θb and θ are not equal to each other but there could be big difference between them. That is to say, according to the conventional method of measuring a tilt quantity, the variation in the shape of the disc with the rotational frequency of the disc is not taken into consideration, and therefore, there could be a significant difference between the actual tilt quantity and the calculated one.

Hereinafter, an example in which a particularly big difference could be made will be described.

Suppose the optical disc has a rotational frequency C (where A<C<B). In that case, the storage layer of the optical disc will be deformed as indicated by the graph "Shape u".

Normally, as the rotational frequency increases, the disc gradually changes its shapes from shape s (at the rotational frequency A) to shape t (at the rotational frequency B). That is to say, the upward or downward deformation of the disc diminishes.

However, although the rotational frequency C satisfies A<C<B, a significant deformation is caused as shown in FIG. 15. This is probably because the optical disc would have produced some resonance due to the presence of a gas flow in the enclosed space of the optical disc drive.

Hereinafter, it will be described how to figure out the tilt quantity when a CLV control is performed on a disc motor. The tilt quantity is calculated by measuring the distances between the disc and the package of the pickup at two different radii on the disc (e.g., at the radial locations r1 and r2). First, suppose the disc has rotational frequencies A and C at the radial locations r1 and r2, respectively. And according to the method disclosed in Patent Document No. 1, the tilt quantity when disc resonance is produced at the rotational frequency C is calculated as:

$$\theta = \arctan((fc2-fa1)/(r2-r1))$$

As shown in FIG. 15, fc2 is much smaller than fa1. That is why particularly in a situation where a disc resonance has been produced at only one of two different radial locations for measurement, if the measurements are done at two different radial locations on the optical disc, the tilt quantity calculated will be quite different from the actual tilt quantity. The actual tilt quantity is given by arctan((fa2−fa1)/(r2−r1)), which is approximately equal to arctan((fc2−fc1)/(r2−r1)).

To prevent such a disc resonance from being produced, a technique for regulating a gas flow that would produce the disc resonance by cutting recesses on the ceiling plate of an optical disc drive was proposed. FIG. 16(a) illustrates a general appearance of an optical disc drive 200 including a ceiling plate with recesses 210. If there were those recesses 210, the disc resonance could be reduced but the thickness of the optical disc drive could not be reduced beyond a certain limit, which is a problem, too.

FIG. 16(b) is a front view of the optical disc drive 200. Since the depth h1 of the recesses 210 should be great enough to control the gas flow, the thickness H1 of the optical disc drive 200 would also be limited by that depth h1.

Recently, optical disc drives, particularly those for laptop PCs, are required to have as small a thickness as possible. Therefore, there is a growing demand for optical disc drives that have a structure free from such limitations. A sensor for detecting the tilt quantity could be provided. In that case, however, not only should some space be left for the sensor but also would the overall cost rise due to the addition.

An object of the present invention is to measure the tilt quantity of, and perform a tilt control on, an optical disc accurately without depending on the rotation control method. Another object of the present invention is to measure the tilt quantity of, and perform a tilt control on, an optical disc easily and accurately with the disc resonance allowed but without using any tilt sensor.

Means for Solving the Problems

An optical disc drive according to the present invention includes: a motor for rotating an optical disc; an optical system for irradiating the optical disc with a light beam; a moving mechanism for moving the optical system along the radius of the optical disc; a focus control section for controlling movement of the optical system perpendicularly to the optical disc based on drive values, thereby focusing the light beam onto a storage layer of the optical disc; and a tilt control section for measuring the tilt quantities of the storage layer at multiple different radial locations on the optical disc based on drive values for the respective radial locations when the focus control section focuses the light beam there. When the tilt control section measures the tilt quantities, the motor keeps the rotational frequency of the optical disc constant and the tilt control section uses the drive values that have been obtained at the respective radial locations.

The optical disc drive may further include a driving section for driving the optical system perpendicularly to the optical disc based on the drive values and adjusting the angle defined by the optical axis of the optical system with respect to the optical disc. When the tilt control section measures the tilt quantities, the motor may rotate the optical disc at a rotational frequency associated with one of the multiple different radial locations, and the tilt control section may generate a drive value for reducing the magnitude of coma aberration of a light beam spot on the storage layer of the optical disc based on the tilt quantities measured and supply it to the driving section.

The optical disc may have a resonant rotational frequency at which resonance is produced by rotation. If the rotational frequency of the optical disc falls within the range of ±10% of the resonant rotational frequency, the drive values for the optical system when the focus control section focuses the light beam at the respective radial locations may oscillate in a longer period than the period of rotation of the optical disc. And the tilt control section may obtain a number of drive values at the respective radial locations over a period that is longer than the oscillation period of the drive values for the optical system and may determine a representative drive value based on the multiple drive values obtained.

The tilt control section may determine the average of the multiple drive values obtained to be the representative drive value.

When the optical disc drive writes information on the optical disc, the optical disc may be rotated at a rotational frequency that is associated with a radial location where information starts to be written and the tilt quantity of the storage layer may be measured at the same radial location where writing is started.

Since the optical disc drive has started to write information on the optical disc and until the optical disc drive finishes writing the information, the optical disc may be rotated at a rotational frequency that is associated with a radial location where information will be written next time and the tilt quantity of the storage layer at the same radial location where writing will be resumed next time may be measured.

If the tilt control section measures the tilt quantities in multiple areas of the storage layer, the motor may keep the rotational frequency of the optical disc constant in at least two radial locations within the measuring areas but may change the rotational frequencies of the optical disc when the measuring areas are changed.

The optical disc may have a resonant rotational frequency at which resonance is produced by rotation. If the rotational frequency of the optical disc falls within the range of ±10% of the resonant rotational frequency, the tilt control section need not measure the tilt quantities.

The tilt control section may calculate the tilt quantities of the optical disc, which is rotating within the range, based on the tilt quantities that have been measured at rotational frequencies outside of the range.

The optical disc drive may further include a housing for enclosing the optical disc airtight when the optical disc is loaded. The housing may have no structure that changes a gas flow when the optical disc rotates.

Another optical disc drive according to the present invention includes: a motor for rotating an optical disc; an optical system for irradiating the optical disc with a light beam; a moving mechanism for moving the optical system along the radius of the optical disc; a focus control section for controlling movement of the optical system perpendicularly to the optical disc based on drive values, thereby focusing the light beam onto a storage layer of the optical disc; and a tilt control section for measuring the tilt quantities DT of the storage layer at multiple different radial locations on the optical disc based on drive values for the respective radial locations when the focus control section focuses the light beam there. The optical disc has at least two storage layers. The tilt control section calculates a tilt correction Y for one of the at least two storage layers by changing the values of a set of coefficients a and b in Y=a×DT+b, where a is a coefficient and b is an offset that are defined in advance for each of the two storage layers.

The optical disc drive may further include a coefficient selecting section for storing multiple sets of coefficients a and offsets b that have been set in advance for each of the at least two storage layers and selecting a set of the coefficient a and the offset b that is associated with the storage layer on which the focal point of the light beam is located. The coefficient selecting section may supply the selected set of the coefficient a and the offset b to the tilt control section.

Effects of the Invention

When an optical disc drive according to the present invention measures the tilt quantity of an optical disc, its motor keeps the rotational frequency of the optical disc constant, and its tilt control section calculates the tilt quantity of the storage layer based on drive values that have been obtained at respective radial locations for its focus control section. For example, the tilt control section may figure out the tilt quantity of the storage layer based on the average of the drive values for the focus control section. Since the rotational frequency is constant, there is no need to consider the variation in the height of the disc anymore. As a result, tilt control can be performed precisely in both CLV and ZCLV controls. Consequently, not just the quality of data to be read or written but also the reliability of the read and write operation can be kept high.

Also, the optical disc drive of the present invention can measure the tilt quantity at every radial location based on the actual disc rotational frequency at that location. As a result, the optical disc drive can perform a precision tilt control at each and every radial location on the optical disc.

In addition, the optical disc drive of the present invention can minimize the effect of a disc deformation (i.e., the variation in distance between the optical pickup and storage layer) to be caused by disc resonance in a frequency range that does not agree with, and is lower than, the disc rotational frequency, and can measure a focus drive value accurately. Furthermore, the optical disc drive of the present invention can prevent the tilt measuring accuracy from being decreased by the deformation of the disc due to the disc resonance, thus realizing very accurate tilt measurement. As a result, the optical disc drive can perform the tilt control with high precision and without being affected by the disc resonance.

On top of that, the optical disc drive of the present invention does not have to measure the tilt quantity on every storage layer and can calculate a tilt correction for all storage layers just by measuring the tilt quantity of only one layer. Consequently, the optical disc drive can get tilt correction done on all storage layers in a short tilt measuring time.

Figure 1:
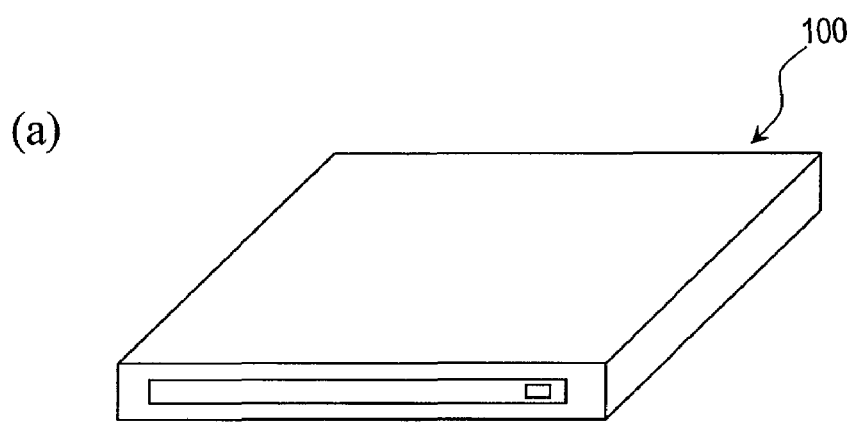
FIG. 1(*a*) illustrates a general appearance of an optical disc drive 100 according to a first preferred embodiment of the present invention, and FIG. 1(*b*) is a front view thereof.
Figure 1:
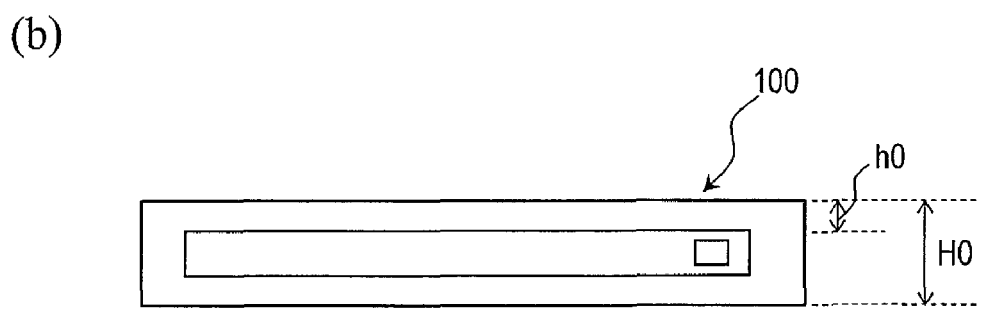

DESCRIPTION OF REFERENCE NUMERALS 1 objective lens
2 focus actuator
3 light source
4 motor control section
5 photodetector section
7 focus error generator
8 microcomputer
9 focus control section
10 disc motor
12 first focus actuator driver
13 second focus actuator driver
14 focus drive measuring section
15 transport stage
16 rotational frequency calculating section
17 hold signal generating section
18 ΔFC memory
19 tilt control section
20 optical disc
21 tilt correction coefficient selecting section
22 first storage layer
23 second storage layer
24 multilayer optical disc

BEST MODE FOR CARRYING OUT THE INVENTION

Hereinafter, preferred embodiments of the present invention will be described in detail with reference to the accompanying drawings.

Embodiment 1

FIG. 1(a) illustrates a general appearance of an optical disc drive 100 according to a first preferred embodiment of the present invention. In Measuring the Tilt quantity of an optical disc loaded, the motor of this optical disc drive 100 keeps the rotational frequency of the optical disc constant. Meanwhile, the tilt control section thereof measures the tilt quantity of its storage layer based on drive values that have been obtained at multiple different radial locations for the focus control section thereof. Since the rotational frequency is constant, there is no need to sense any variation in the height of the disc anymore. That is why not only when performing a constant angular velocity (CAV) control but also when performing a constant linear velocity (CLV) or zoned constant linear velocity (ZCLV) control, the optical disc drive 100 can measure the tilt quantity of the given optical disc accurately. As a result, a precision tilt control is realized.

Figure 16:
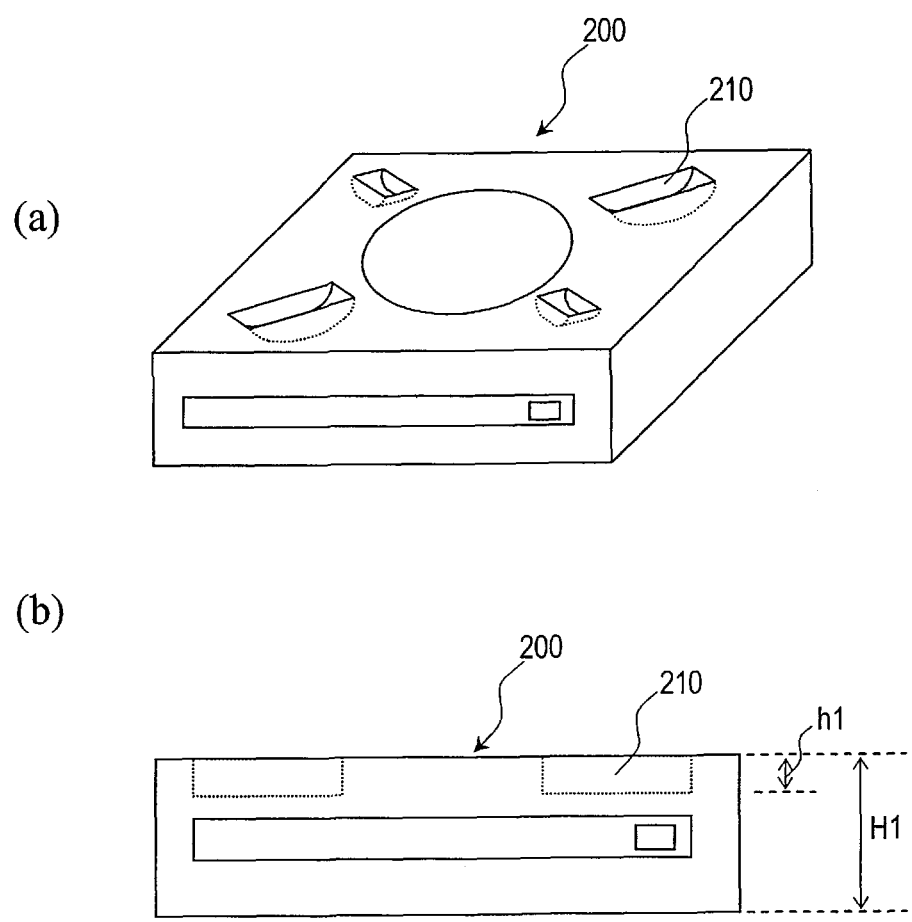
FIG. 16(a) illustrates a general appearance of an optical disc drive 200 including a ceiling plate with recesses 210 and FIG. 16(b) is a front view of the optical disc drive 200.

Among other things, the optical disc drive 100 can measure the tilt quantity of the optical disc accurately even at a rotational frequency at which the disc resonance is produced. For that reason, there is no need to dent the ceiling plate of the housing (such as the recess 21 of the conventional optical disc drive shown in FIG. 16(a)) to minimize the disc resonance, thus contributing to reducing the thickness of the optical disc drive 100.

FIG. 1(b) is a front view of the optical disc drive 100. Since there is no recess on the ceiling plate of the housing, the distance h0 between the surface of the optical disc housed in the optical disc drive 100 and the ceiling plate of the optical disc drive 100 can be shorter than the distance h1 shown in FIG. 16(b). Consequently, the thickness H0 of the optical disc drive 100 can also be smaller than the thickness H1 of the optical disc drive 200 shown in FIG. 16(b).

Next, the configuration of the optical disc drive 100 and the tilt control performed precisely and easily by the optical disc drive 100 will be described with reference to FIG. 2.

Figure 2:
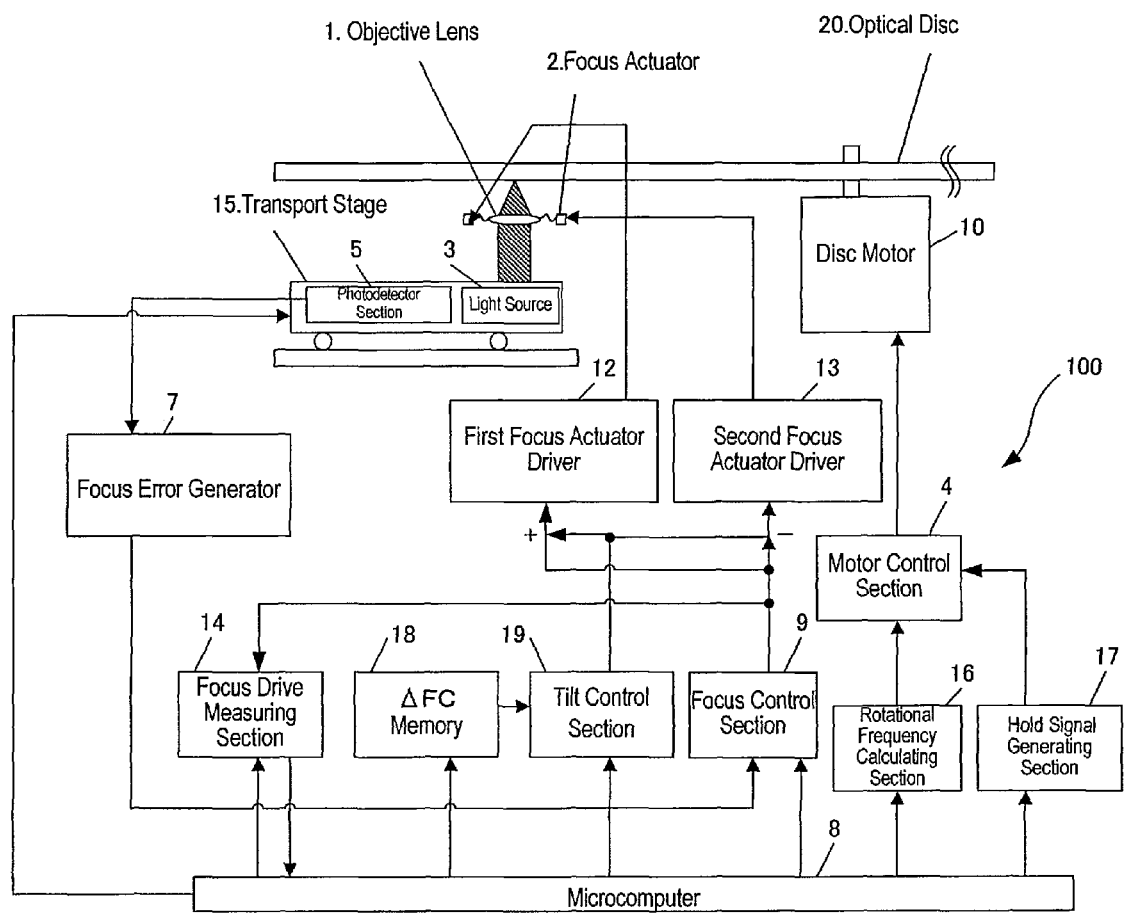
FIG. 2 shows an arrangement of functional blocks in the optical disc drive 100 of the first preferred embodiment.

FIG. 2 shows the arrangement of functional blocks for the optical disc drive 100 of this preferred embodiment. Hereinafter, it will be described how the optical disc drive 100 performs a focus control, a tilt control and a motor control to describe the respective components of the optical disc drive 100.

First, it will be described how this optical disc drive performs a focus control.

A light beam emitted from a light source 3 such as a semiconductor laser diode is focused by an objective lens 1, which is provided to converge the light beam, onto the storage layer (i.e., the data storage plane) of an optical disc 20, which has been given an exemplary storage medium. The light beam is diffracted and reflected by the storage layer of the optical disc 20 and a portion of that light returns and is eventually received and detected by a photodetector section 5. The objective lens 1 is moved by a focus actuator 2 perpendicularly to the storage layer (such a direction will be referred to herein as a "focusing direction"), thereby changing the converging state of the light beam on the storage layer of the optical disc 20.

The detection signal, representing the returning light, is output from the photodetector section 5 to a focus error generator 7, which generates a focus error (FE) signal representing a converging state of the light beam on the storage layer of the optical disc 20. Then, the FE signal thus generated is supplied to a focus control section 9.

The focus control section 9 may be a digital filter implemented as a digital signal processor (DSP), for example, which performs phase compensation and gain compensation on the FE signal and then outputs it as a focus drive signal. Then, the focus drive signal is amplified by first and second focus actuator drivers 12 and 13, and the amplified signals drive the focus actuator 2. In this manner, a focus control is carried out such that the light beam on the storage layer of the optical disc always maintains a predetermined converging state.

Next, it will be described how the optical disc drive 100 performs a tilt control and a motor control.

A microcomputer 8 supplies radius information, showing at which radial location the light beam spot is now located on the storage layer of the optical disc 20, to a rotational frequency calculating section 16. The location of the light beam spot is determined by the position of a transport stage 15, to which an optical pickup, including the objective lens 1, the light source 3, the photodetector section 5 and so on within a single package, is attached. The optical pickup operates while being attached to the transport stage 15, and is moved along the radius of the optical disc by the transport stage 15. It should be noted that the position of the objective lens 1 inside the optical pickup is precisely controlled by another actuator (not shown), which is provided separately from the focus actuator 2.

In accordance with the instruction given by the microcomputer 8, the rotational frequency calculating section 16 calculates a target disc motor rotational frequency based on the radius information, and gives a rotation command to a motor control section 4 such that the optical disc 20 rotates at a desired rotational frequency. Alternatively, the microcomputer 8 may output a signal period signal to the rotational frequency calculating section 16 based on the signal period (not shown) of the storage layer of the optical disc 20. In that case, in response to the signal period signal, the rotational frequency calculating section 16 calculates a target disc motor rotational frequency and gives a rotation command to the motor control section 4. Following the rotation command, the motor control section 4 drives the disc motor 10, thereby getting the rotation of the optical disc 20 controlled at a desired rotational frequency. In this manner, the motor control is realized.

When the rotational frequency of the optical disc 20 reaches the desired value, the microcomputer 8 instructs a hold signal generating section 17 to fix the disc motor rotational frequency. Following the instruction given by the microcomputer 8, the hold signal generating section 17 outputs a hold signal to the motor control section 4. In response to the hold signal, the motor control section 4 changes its modes of operation to maintain the current rotational frequency of the disc motor 10.

Next, it will be described how to detect the tilt quantity during the tilt control. With the focus control still ON, a light beam spot is formed at a radial location x1 on the optical disc 20. Also, at this point in time, following the instruction given by the microcomputer 8, the rotational frequency calculating section 16 gives a rotation command to the motor control section 4 such that the optical disc 20 rotates at the desired rotational frequency. On receiving the rotation command, the motor control section 4 drives the disc motor 10, thereby rotating the optical disc 20 at the desired rotational frequency. When the rotational frequency of the optical disc 20 reaches the desired value, the microcomputer 8 instructs the hold signal generating section 17 to fix the disc motor rotational frequency. Following the instruction given by the microcomputer 8, the hold signal generating section 17 outputs a hold signal to the motor control section 4. In response to the hold signal, the motor control section 4 changes its modes of operation to maintain the current rotational frequency of the disc motor 10.

In this state, a focus drive measuring section 14 measures an average focus drive value y1 at the radial location x1 and outputs it to the microcomputer 8. Next, the transport stage 15 shifts the light beam spot to a different radial location x2 on the optical disc 20 and the focus drive measuring section 14 measures an average focus drive value y2 there. In this manner, average focus drive values (y1 to yn) are measured n times (where n is an integer that is equal to or greater than two) at respective radial locations x1 through xn.

Based on the information (x1, y1) through (xn, yn), the microcomputer 8 derives a linear approximation equation as the following Equation (1) (e.g., by linear approximation using the minimum square method):

$$y = l \cdot x + m \quad (1)$$

where l is a coefficient representing the tilt of the disc and m is a predetermined offset (e.g., a focus drive value that would be required to form a light beam spot on the storage layer when the disc is not tilted).

Using Equation (1), the microcomputer 8 calculates a variation $\Delta FC$ in average focus drive with respect to a shift to a predetermined radius $\Delta r$ by the following Equation (2):

$$\Delta FC = (l \cdot (r + \Delta r) + m) - (l \cdot r + m) = l \cdot \Delta r \quad (2)$$

Then, the microcomputer 8 saves the variation $\Delta FC$ thus obtained in a $\Delta FC$ memory 18.

Based on the focus drive differences $\Delta FC$ that have been accumulated in the $\Delta FC$ memory 18 by repeatedly performing these processing steps a number of times, the tilt control section 19 calculates a tilt quantity z by the following Equation (3):

$$z = k \cdot \Delta FC + OFS \quad (3)$$

where k is a coefficient for converting the focus drive difference into a tilt quantity and OFS is a predetermined offset (i.e., the quantity of a lens tilt that is needed to reduce the coma aberration of a light beam spot to zero when no disc tilt is produced).

The tilt control section 19 gets radius information, showing at which radial location the light beam spot is now located on the optical disc 20, from the microcomputer 8 and outputs a tilt drive signal based on Equation (3). The tilt drive signal is either added to the focus drive signal of the first focus actuator driver 12 or subtracted from that of the second focus actuator driver 13.

Using the tilt drive signal, the tilt control section 19 provides outputs of mutually opposite polarities for the first and second focus actuator drivers 12 and 13, thereby driving the objective lens 1 to change the angles of the objective lens 1. In this manner, the tilt angles formed by the optical axis of the light beam, which is irradiating the optical disc 20, with respect to the optical disc 20 are changed. As a result, the objective lens 1 is controlled so as to reduce the coma aberration of the light beam spot on the storage layer of the optical disc 20 (to zero, for example) and the tilt control gets done.

Hereinafter, it will be described in further detail with reference to FIG. 3 exactly how to detect the tilt quantity.

Figure 3:
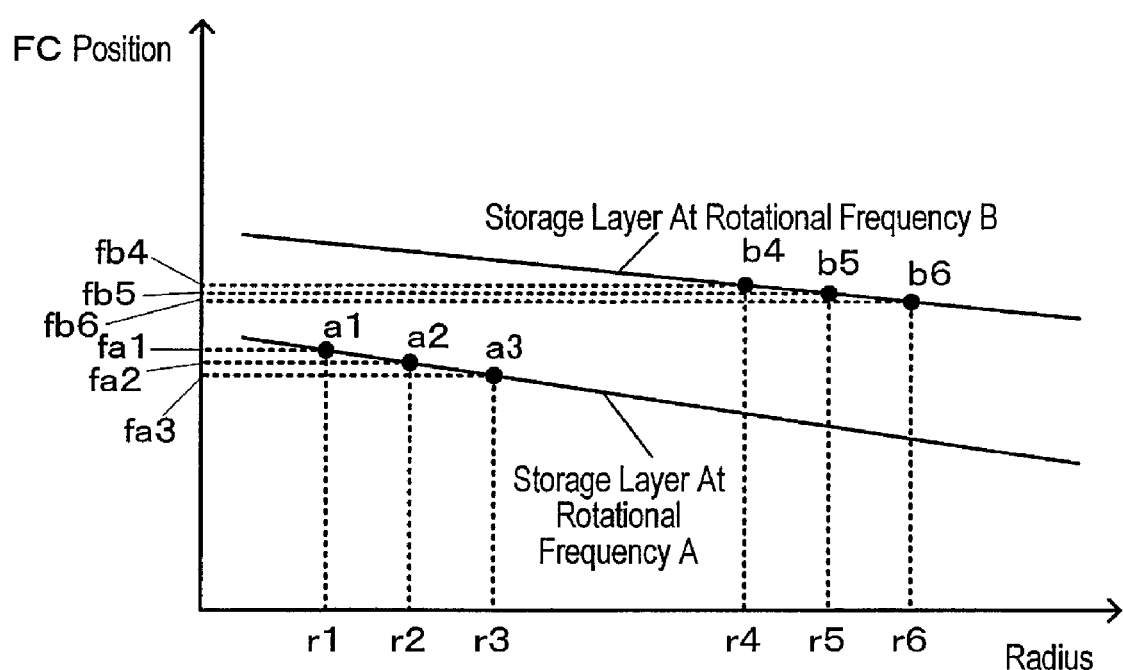
FIG. 3 schematically shows how the optical disc drive 100 measures the tilt.

FIG. 3 schematically shows how the optical disc drive 100 measures the tilt quantity. In this example, the optical disc 20 is supposed to have its rotation controlled by the CLV control method and is also supposed to rotate at a rotational frequency A at a radial location r1 and at a rotational frequency B at a radial location r4, respectively.

In measuring the tilt quantity of the storage layer of the optical disc that is rotating at the rotational frequency A, first, the optical disc drive 100 finds the position fa1 of the objective lens 1 in the FC direction (i.e., perpendicularly to the disc) with respect to the package of the optical pickup while rotating the optical disc 20 at the rotational frequency A at the radial location r1. After that, while maintaining that rotational frequency, the optical disc drive 100 also finds the FC positions fa2 and fa3 at other radial locations r2 and r3.

On the other hand, in measuring the tilt quantity of the storage layer of the optical disc that is rotating at the rotational frequency B, the optical disc drive 100 finds the FC positions fb4, fb5 and fb6 at the radial locations r4, r5 and r6, respectively, while rotating the optical disc 20 at the rotational frequency B at the radial location r4.

In the preferred embodiment described above, the optical disc drive 100 measures a focus drive value, which is the average of focus drives, instead of finding the FC positions. For example, the optical disc drive 100 measures a focus drive value fda1 as the average of focus drives at the FC position fa1. It should be noted that the FC position and the focus drive value should have such a one-to-one correspondence in the following description.

Figure 4:
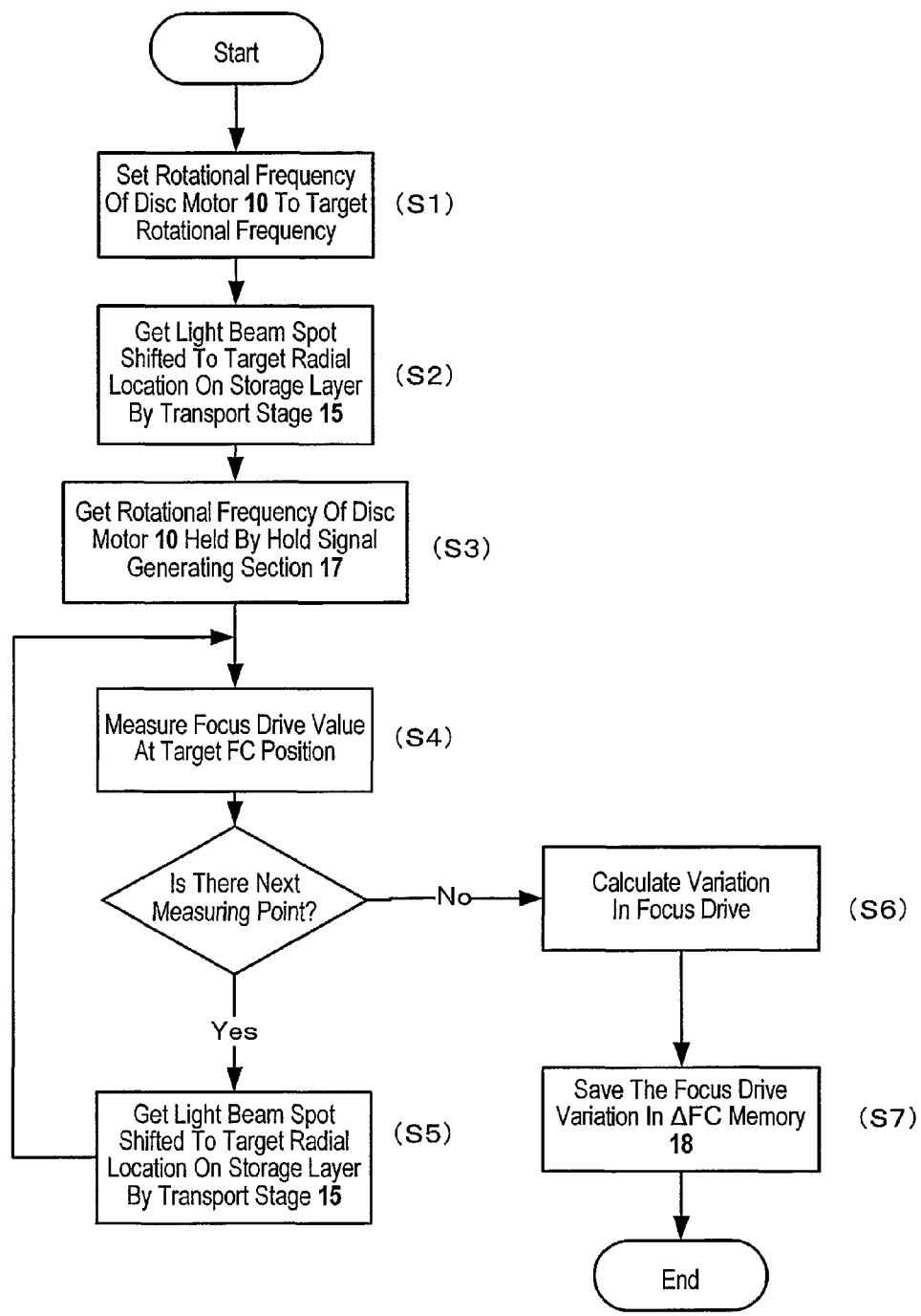
FIG. 4 is a flowchart showing a procedure in which the optical disc drive 100 of the first preferred embodiment measures the tilt.

FIG. 4 is a flowchart showing the procedure in which the optical disc drive 100 of this preferred embodiment measures the tilt quantity. In the following example, the tilt quantity at the rotational frequency A shown in FIG. 3 is supposed to be measured.

First, in Step S1 shown in FIG. 4, just before the light beam spot is shifted to the radial location r1, the rotational frequency calculating section 16 adjusts the rotational frequency of the optical disc 20 to the rotational frequency A and the motor control section 4 controls its rotation so as to maintain that rotational frequency A. Next, in Step S2, the transport stage 15 moves the optical pickup, thereby shifting the light beam spot to a1 (at the radial location r1) on the storage layer.

Subsequently, in Step S3, the microcomputer 8 instructs the hold signal generating section 17 to hold the rotational frequency of the optical disc at the rotational frequency A. In response, the hold signal generating section 17 controls the motor control section 4 to get the rotational frequency A held. In the next processing step S4, the focus drive measuring section 14 measures a focus drive value fda1 as the average of focus drives at the FC position fa1.

Next, in Step S5, the transport stage 15 moves the optical pickup, thereby shifting the light beam spot to the radial location r2, where the focus drive measuring section 14 performs the processing step S4, i.e., measures a focus drive value fda2 as the average of focus drives at the FC position fa2.

Thereafter, the process advances to the processing step S5 again to measure a focus drive value fda3 as the average of focus drives at the FC position fa3 that is associated with the radial location r3.

After the measurements have all been done at every measuring point, the microcomputer 8 will substitute three sets of data (r1, fda1), (r2, fda2) and (r3, fda3) in Step S6 into Equation (1), thereby calculating the tilt l.

For example, the microcomputer 8 may calculate a first tilt l1 based on (r1, fda1) and (r2, fda2) and then calculate a second tilt l2 based on (r2, fda2) and (r3, fda3). Then, the microcomputer 8 adopts the average of l1 and l2 as the tilt l that has been obtained based on these three sets of data and calculates a variation $l \cdot (r3-r1)$ in focus drive.

In order to obtain the tilt quantity (i.e., tilt angle) at the rotational frequency A, it should be enough to calculate the tilt l only. In this preferred embodiment, however, the variation $l \cdot (r3-r1)$, i.e., the focus drive difference $\Delta FC$, is calculated to make this drive even more effective in actual use. That is to say, if the focus drive difference $\Delta FC$ has been calculated, the value may be used as a difference in drive values to be supplied to the focus actuator and the tilt angle of the objective lens 1 can be determined more easily. In this case, the light beam spot is located at a1 to a3 on the storage layer.

Next, in Step S7, the microcomputer 8 saves the variation in the $\Delta FC$ memory 18. Although the variation in focus drive is saved in the memory in this preferred embodiment, the tilt l may be stored in the memory instead.

Likewise, even at the rotational frequency B, after having adjusted and controlled the rotational frequency of the optical disc to the rotational frequency B, the microcomputer 8 also shifts the light beam spot to radial locations r4 to r6 to measure the average focus drive values fdb4 to fdb6 at the FC positions fb4 to fb6 that are associated with the respective radial locations.

Then, the microcomputer 8 substitutes these three measuring points (r4, fdb4), (r5, fdb5) and (r6, fdb6) into Equation (1) to calculate the tilt l'. Thereafter, the microcomputer 8 calculates a focus drive variation $l' \cdot (r6-r4)$ based on the tilt l' thus obtained and saves it in the $\Delta FC$ memory 18. As in doing measurements on r1 to r3 described above, the tilt l' may also be saved in the memory.

Optionally, to simplify the processing and shorten the measuring time, the number of measuring points when the optical disc has the rotational frequency A may be two (e.g., at the radial locations r1 and r2) and the number of measuring points when the optical disc has the rotational frequency B may also be two (e.g., at the radial locations r4 and r5). In that case, fda2−fda1 and fdb5−fdb4 may be respectively saved in the $\Delta FC$ memory 18.

Next, it will be described how such processing should be performed when the resonance characteristic of an optical disc needs to be taken into consideration.

Figure 5:
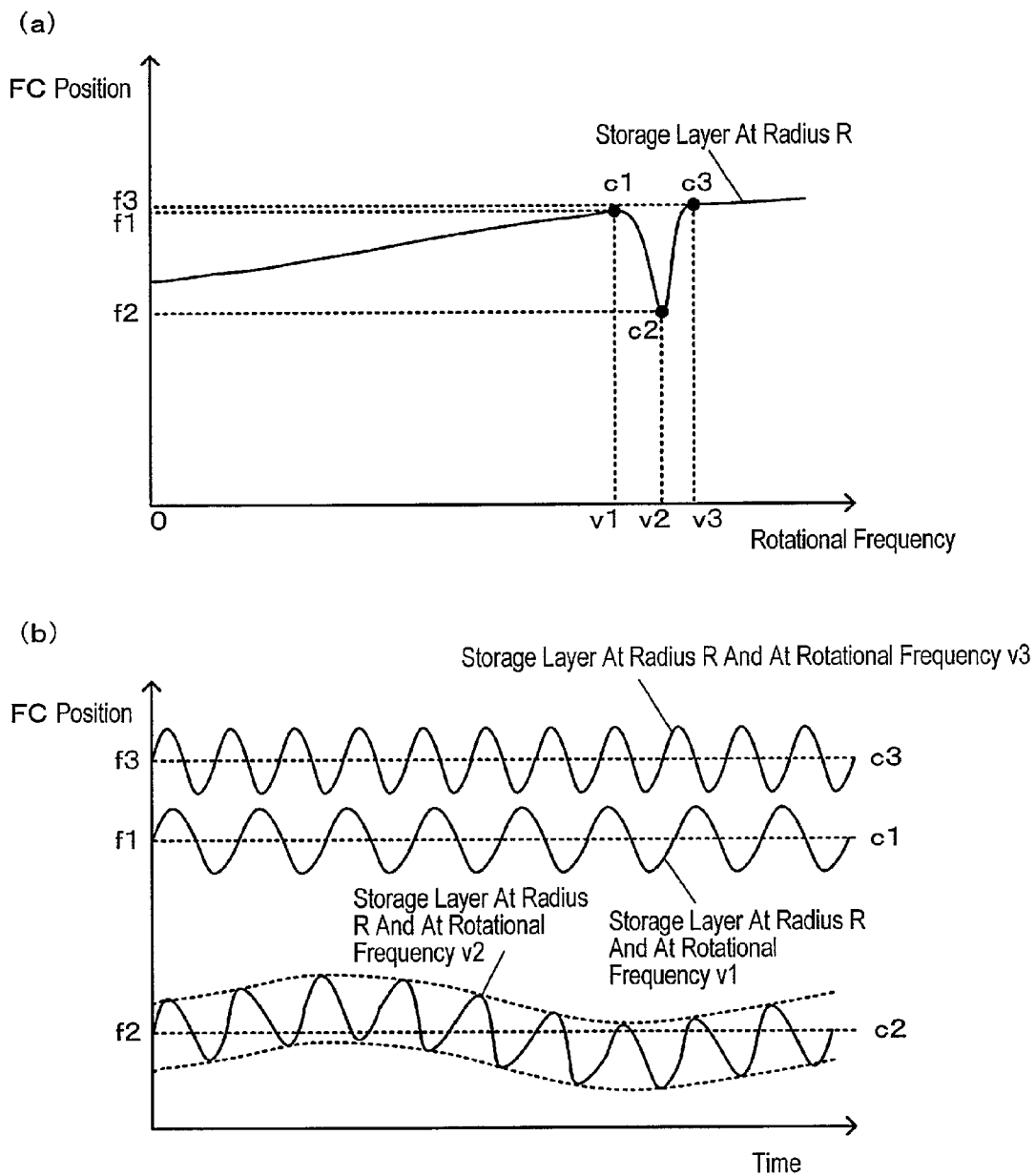
FIG. 5(a) shows how the FC position (height) of the storage layer at a radial location R changes with the rotational frequency of the optical disc and FIG. 5(b) is a timing diagram showing variations in FC position at a predetermined radial location in the disc resonance state and in normal state.
Figure 14:
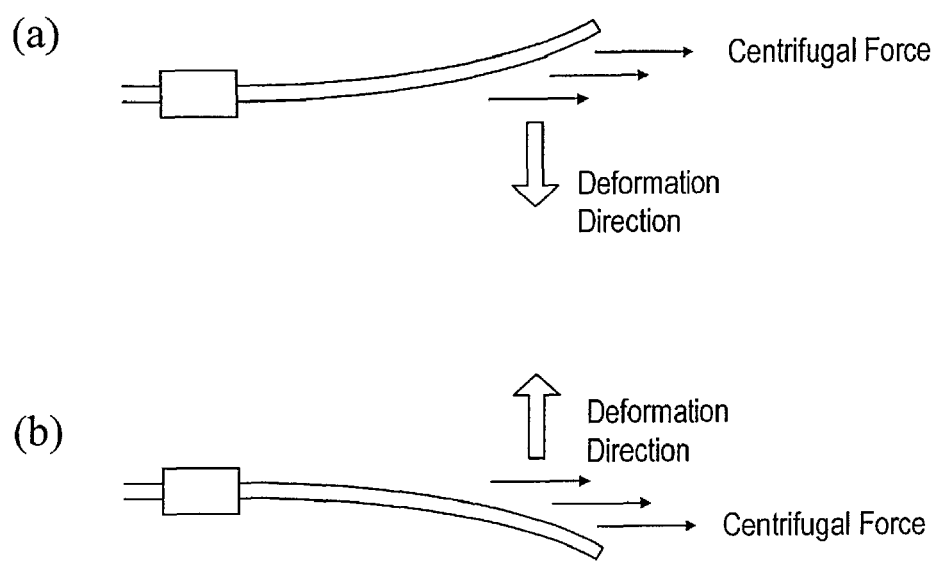
FIGS. 14(a) and 14(b) show the direction in which centrifugal force is produced and deformation directions of the optical disc due to the centrifugal force when an upwardly deformed disc is rotated and when a downwardly deformed disc is rotated, respectively.
Figure 15:
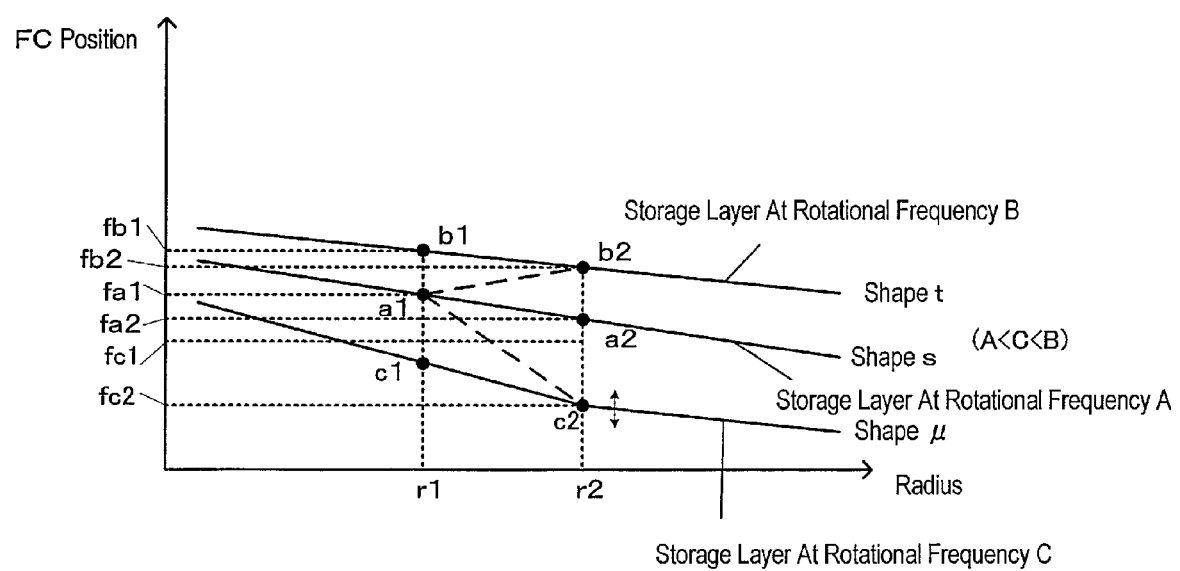
FIG. 15 schematically shows how an optical disc may change its shapes with the rotational frequency.

FIG. 5(a) shows how the FC position (i.e., the height) of the storage layer at a radial location R changes with the rotational frequency of the optical disc. In FIG. 5(a), the ordinate represents the FC position and the abscissa represents the rotational frequency of the optical disc. In this example, the optical disc is supposed to have a downwardly deformed shape such as that shown in FIG. 14(b).

As can be seen easily from FIG. 5(a), the FC position gradually rises upward at rotational frequencies of 0 through v1. This variation should be caused by the centrifugal force that is produced by the rotation of the disc.

However, at rotational frequencies of v1 through v2, the FC position steely falls from c1 all the way down to c2. That is to say, the average of the positions in the focus control direction (i.e., FC positions) changes significantly from f1 to f2.

Furthermore, at rotational frequencies of v2 to v3, the FC position rises steeply again to go back to a point c3, which is almost as high as the point c1. That is to say, the average FC position of the storage layer at the radial location R goes back from f2, which is much lower than the previous position, to f3 again. Thereafter, from the rotational frequency v3 on, the position is substantially settled. That is why this optical disc should have produced resonance at the rotational frequency v2.

An optical disc will produce disc resonance on the following principle. Specifically, the optical disc is usually used to rotate in an enclosed space. The optical disc does not have perfectly flat surfaces, and therefore, will cause convection of the air in the enclosed space when rotating. The convected air will be pushed by the walls of the enclosed space back toward the optical disc and collide against the optical disc again. As a result, the optical disc is deformed by this returning airflow (gas flow). The rotational frequency at which the optical disc is deformed significantly will be referred to herein as a "disc resonance frequency" and such a phenomenon that would cause significant deformation of the disc will be referred to herein as "disc resonance". It should be noted that the "disc resonance" originally refers to a mode of oscillation that would be caused according to the size of the disc and means resonance that is not affected by the air.

FIG. 5(b) is a timing diagram showing variations in FC position at a predetermined radial location in the disc resonance state and in normal state. In FIG. 5(b), the ordinate represents the FC position and the abscissa represents the time.

As shown in FIG. 5(b), the point c1 shown in FIG. 5(a) oscillates synchronously with the rotation of the disc, and the average of its FC positions is f1.

If the rotational frequency of the disc is increased from v1 to v2, the disc is deformed significantly due to the disc resonance and the average of FC positions changes significantly into f2. In addition, at the rotational frequency v2, displacement due to swelling is also produced. This displacement is not the periodic variation synchronized with the rotation of the disc but another type of oscillation that has a longer period than that of the disc rotational frequency. However, if the rotational frequency of the optical disc is increased to v3, the disc resonance has no influence anymore and the average of the FC positions becomes f3 again, which is almost as high as the average f1 of FC positions at the point c1. On top of that, no variations are caused by swelling of the optical disc and only periodic variations synchronized with the rotation of the disc are observed as in the point c1.

As described above, at rotational frequencies in the vicinity of the disc resonance frequency, periodic oscillations that have a longer period than the rotation of the disc are observed.

That is why to accurately calculate the average of FC positions at rotational frequencies in the vicinity of the disc resonance frequency (e.g., within ±10% of the resonant rotational frequency), the FC positions need to be measured for an amount of time that is sufficiently longer then one period of rotation (e.g., for an amount of time it takes for the disc to turn at least 20 times) and the average of the FC position should be worked out.

As used herein, the "amount of time that is sufficiently longer than one period of rotation" is approximately 200 ms or more if the rotational frequency is in the range of 6,000 rpm to 7,000 rpm.

In this manner, the tilt can be measured highly accurately without letting the tilt measuring accuracy be affected by the displacement of the disc that would be caused by the disc resonance. As a result, an optical disc drive that can perform tilt control highly precisely without being affected by the disc resonance can be provided.

It should be noted that it would take a rather long time to work out the average of FC positions in the vicinity of the disc resonance frequency and it would be difficult to measure the tilt quantity in a short time. That is why at rotational frequencies in the vicinity of the disc resonance frequency, the tilt need not be measured but an estimate may be calculated and used at other rotational frequencies.

Suppose the disc resonance is produced when the rotational frequency becomes approximately equal to 6,600 rpm in the vicinity of a radial location of 30 mm while an 8×CLV control is being carried out on a DVD. In that case, at a rotational frequency v1 (of about 8,200 rpm) at a radial location r1 of 24 mm, the tilt quantity t1 is measured by the method described above. Next, at a rotational frequency v2 (of about 5,700 rpm) at a radial location r2 of 35 mm, the tilt quantity t2 is also measured by the method described above. And the tilt quantity t at a radial location r between these two radial locations r1 and r2 can be estimated by substituting t1 and t2 into the following Equation (4):

$$t = (t2 - t1) \cdot (r - r1)/(r2 - r1) + t1 \quad (4)$$

In this manner, the tilt can be measured highly accurately without letting the tilt measuring accuracy be affected by the displacement of the disc that would be caused by the disc resonance. As a result, an optical disc drive that can perform tilt control highly precisely without being affected by the disc resonance can be provided.

The optical disc drive 100 performs mutually different types of rotation controls during the startup of the drive, during a read operation and during a write operation. Specifically, the optical disc drive 100 performs a constant angular velocity (CAV) control during the startup and during the read operation, but performs a constant linear velocity (CLV) or zoned constant linear velocity (ZCLV) control during the write operation. That is why the tilt measuring methods are preferably changed appropriately according to the rotation control method.

FIG. 6(a) shows a relation between the radial locations on the optical disc, at which FC positions (heights) are measured during the startup of the drive and before a read operation, and the rotational frequency of the disc. In the CAV control to be performed when the drive is started and when a read operation is carried out, the rotational frequency of the optical disc is constant irrespective of the radial location. That is why during the CAV control, the optical disc drive 100 measures the FC positions at the five radial locations r1 through r5 that cover almost the entire area of the disc by the method described above to measure the tilt quantity of the optical disc. By performing a tilt control based on the tilt quantity thus measured, the optical disc drive 100 can prepare for the read processing to do next.

Figure 6:
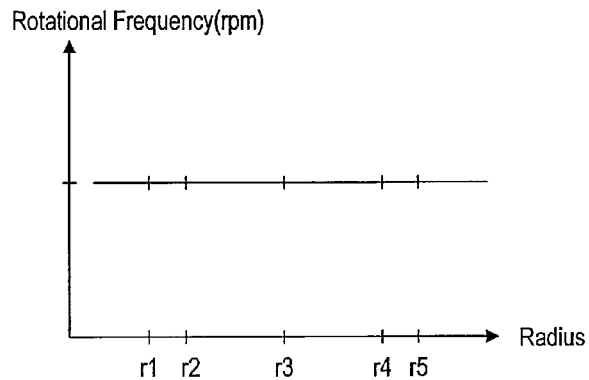
FIG. 6(a) shows exemplary radial locations on the optical disc at which FC positions (heights) are measured during the startup of the drive and before a read operation and FIG. 6(b) shows exemplary disc radial locations where FC positions (heights) are measured before a write operation is started.
Figure 6:
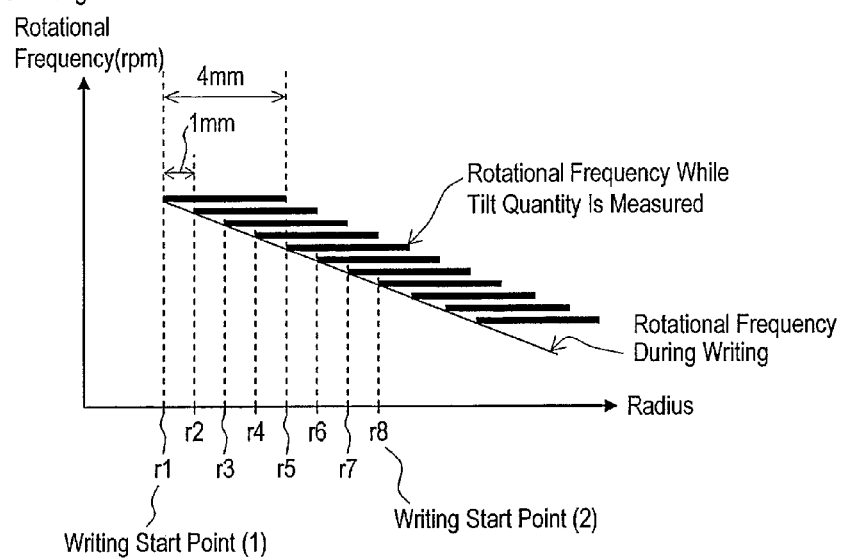

On the other hand, FIG. 6(b) shows exemplary disc radial locations where FC positions (heights) are measured before a write operation is started. In FIG. 2, focus drive values, which have one-to-one relation with FC positions, are measured instead of the FC positions. In the CLV control to be performed during a write operation, the optical disc changes its rotational frequencies with the radial location. Thus, the optical disc drive 100 uses, as a start point, the radial location r1 where writing is started, and measures the FC positions at that location r1 and at another location r5 that is at a predetermined distance (e.g., 4 mm) from the location r1 by the method described above using the rotational frequency at the location r1. At this point in time, the microcomputer 8 shown in FIG. 6 instructs the hold signal generating section 17 to fix the rotational frequency of the disc motor. In accordance with the instruction given by the microcomputer 8, the hold signal generating section 17 outputs a hold signal to the motor control section 4. As a result, the FC positions at these two locations are measured at the constant rotational frequency.

Then, the microcomputer 8 calculates the difference between these two FC positions (or the quantity of disc tilt derived from the difference between the FC positions) and stores it in the ΔFC memory 18 shown in FIG. 2. The tilt control section 19 tilts the objective lens 1 using predetermined coefficient and offset based on the difference between the focus drive values that is stored in the ΔFC memory 18. That is to say, a lens tilt is caused. Thereafter, using that lens tilt quantity, writing is performed on an area between r1 and r2, which may be 1 mm away from r1, for example. Then, using the location r2 as a start point again, the FC positions at that location r2 and at another location r6 that is at a predetermined distance from the location r2 are measured at the rotational frequency at the location r2, thereby measuring the tilt quantity. In this manner, by repeatedly performing measuring and writing from the start through the end of the write operation, writing can be done with the tilt corrected. It should be noted that the tilt measurement and information writing do not have to be performed alternately. Their order and frequency of occurrence may be changed appropriately.

After that, the optical disc drive 100 calculates and stores the tilt quantities one after another with the start point sequentially shifted from the location r1 shown in FIG. 6(*b*) by a predetermined distance (e.g., 1 mm in this example). In this manner, by performing write processing with the lens tilt adjusted from time to time, the write processing can be started just as intended. In addition, since the startup time it takes for the drive to gets ready for starting writing can also be shortened, the write operation can also be started quickly. Furthermore, the reliability of the information stored can be maintained high, too.

In the preferred embodiment described above, the maximum distance between two measuring points (i.e., r1 and r5 shown in FIG. 6(*b*)) is 4 mm and the measurements are done every millimeter. However, this is just an example. The distance between two measuring points and the frequency of occurrence of measurements may be changed according to the amount of information to write or may be increased or decreased according to the total measuring time.

If a number of writing start points have been set (e.g., in a situation where the respective writing start points of two files to write have been determined in advance), not just the tilt quantity at the writing start point of the first file but also that at the writing start point of the next file (e.g., the tilt quantity at the radial location r6 shown in FIG. 6(*b*)) may be measured.

The foregoing statement applies to a CLV control in which information is supposed to be written on an optical disc at a constant rate (e.g., at 6× write rate). In such a CLV control, the closer to the outer edge the radial location is, the lower the rotational frequency.

However, the optical disc drive 100 may change the types of CLV control to perform according to the radial location. For example, the optical disc drive 100 may perform a CLV control that enables 6× writing in an inner area of the optical disc that is inside of a radial location of 30 mm and may perform a CLV control that enables faster 8× writing in an outer area of the optical disc that is outside of the radial location of 30 mm.

If such a writing method is adopted, the rotational frequency does not decrease even when the writing point is close to the outer edge. That is why the rotational frequencies of the optical disc may sometimes agree with each other at different radial locations.

Figure 7:
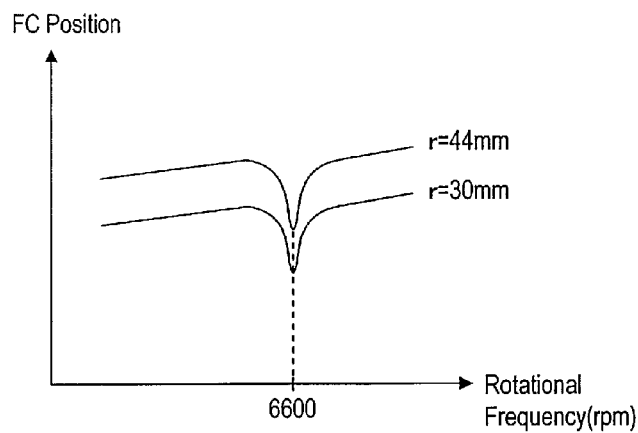
FIG. 7 shows a relation between the FC positions (heights) of the storage layer at radial locations of 30 mm and 44 mm, where the rotational frequencies are equal to each other, and the rotational frequencies of the optical disc.

For example, suppose the rotational frequencies of the optical disc agree with each other at radial locations of 30 mm and 44 mm. FIG. 7 shows a relation between the FC positions (heights) of the storage layer at those radial locations of 30 mm and 44 mm, where the rotational frequencies are equal to each other, and the rotational frequencies of the optical disc. In this example, the optical disc is supposed to have a downwardly deformed shape (such as that shown in FIG. 14(*b*)). The disc resonance is also produced at the same frequency of 6,600 rpm.

Figure 8:
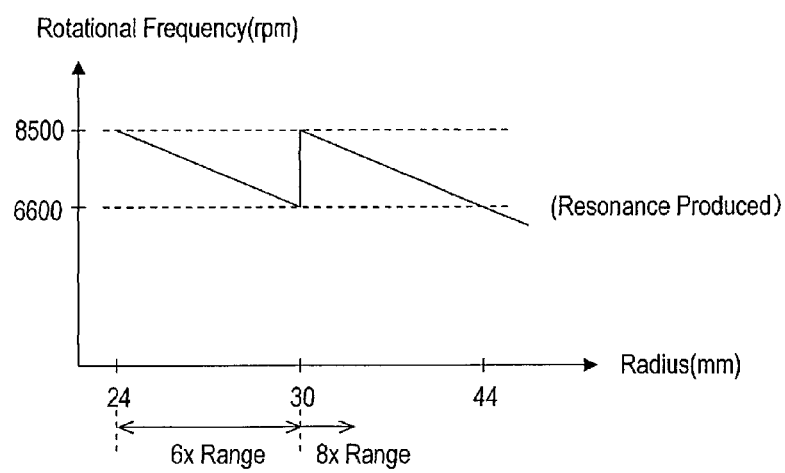
FIG. 8(a) shows a relation between the radial location and the rotational frequency in a situation where the types of CLV control to perform are changed according to the radial location and FIG. 8(b) shows exemplary radial locations on the optical disc where the optical disc drive 100 that performs the CLV control shown in FIG. 8(a) measures the FC positions (heights) before starting the write operation.
Figure 8:
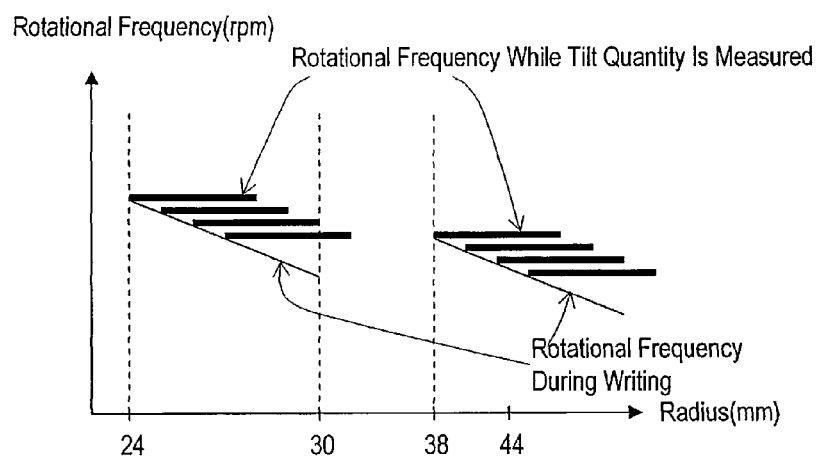

FIG. 8(*a*) shows a relation between the radial location and the rotational frequency in a situation where the types of CLV control to perform are changed according to the radial location. The optical disc drive 100 performs a 6× write operation on the area between radial locations of 24 mm and 30 mm and performs an 8× write operation on the area outside of the radial location of 30 mm. As shown in FIG. 8(*a*), the optical disc is rotated at a rotational frequency of 6,600 rpm that produces disc resonance at the radial locations of 30 mm and 44 mm.

FIG. 8(*b*) shows exemplary radial locations on the optical disc where the optical disc drive 100 that performs the CLV control shown in FIG. 8(*a*) measures the FC positions (heights) before starting the write operation. As described above, the tilt quantity changes according to the rotational frequency of the optical disc. That is why even if the types of CLV control to perform are changed according to the radial location, the tilt quantity still needs to be measured with the optical disc rotated at the rotational frequency under the CLV control that is applied to that radial location. As shown in FIG. 8(*b*), the tilt quantities are measured at rotational frequencies for the CLV control applied to radial locations inside the radial location of 30 mm and at rotational frequencies for the CLV control applied to radial locations in the outside area. FIG. 8(*b*) shows an example of preferred tilt quantity measurement in a situation where the write processing is started at a radial location of 24 mm and then the next write processing is started at a radial location of 38 mm. As in the example shown in FIG. 6(*b*), the maximum distance between the two measuring points is supposed to be 4 mm and measurements are supposed to be repeated at a frequency of occurrence of 1 mm.

Even if such complicated CLV controls are performed with the types of controls changed according to the radial location, the optical disc drive 100 still needs to measure the FC position with the optical disc rotated at the rotational frequency at that radial location as described above. Also, even at a location that is at a predetermined distance from that location, the optical disc drive 100 also measures the FC position and the tilt quantity with the optical disc rotated at the same rotational frequency. In this manner, by performing a write operation with the lens tilt adjusted from time to time, the write processing can be started just as intended. Also, since the startup time to get the drive ready to start the write operation can also be shortened, the write operation can be started quickly, too. Furthermore, the reliability of the information stored can also be maintained high.

In the example described above, the CLV controls are supposed to be performed in two stages with the types of controls changed according to the radial location. However, the number of stages may also be three or more. Even so, the tilt quantities may be measured at respective rotational frequencies for CLV controls applied to the respective radial locations.

The optical disc drive of this preferred embodiment can measure the tilt quantity of an optical disc without using any tilt detection sensor or without depending on the rotation control method of the optical disc. In addition, since the generation of disc resonance is allowed, there is no need to provide rectifying recesses for the ceiling plate of the housing to suppress the disc resonance. That is why the present invention is applicable for use in a drive with a height of about 2 inches (which is called a "half height"), a drive with a height of 12.7 mm and a drive with a height of 9.5 mm (which is so-called an "ultra-slim drive").

Embodiment 2

Next, it will be described with reference to FIGS. 9 through 11 how an optical disc drive according to a second preferred embodiment of the present invention performs a tilt control on a multilayer disc. The tilt control of this preferred embodiment is carried out in view of not only the tilt of the optical disc but also that of the objective lens as well.

Figure 9:
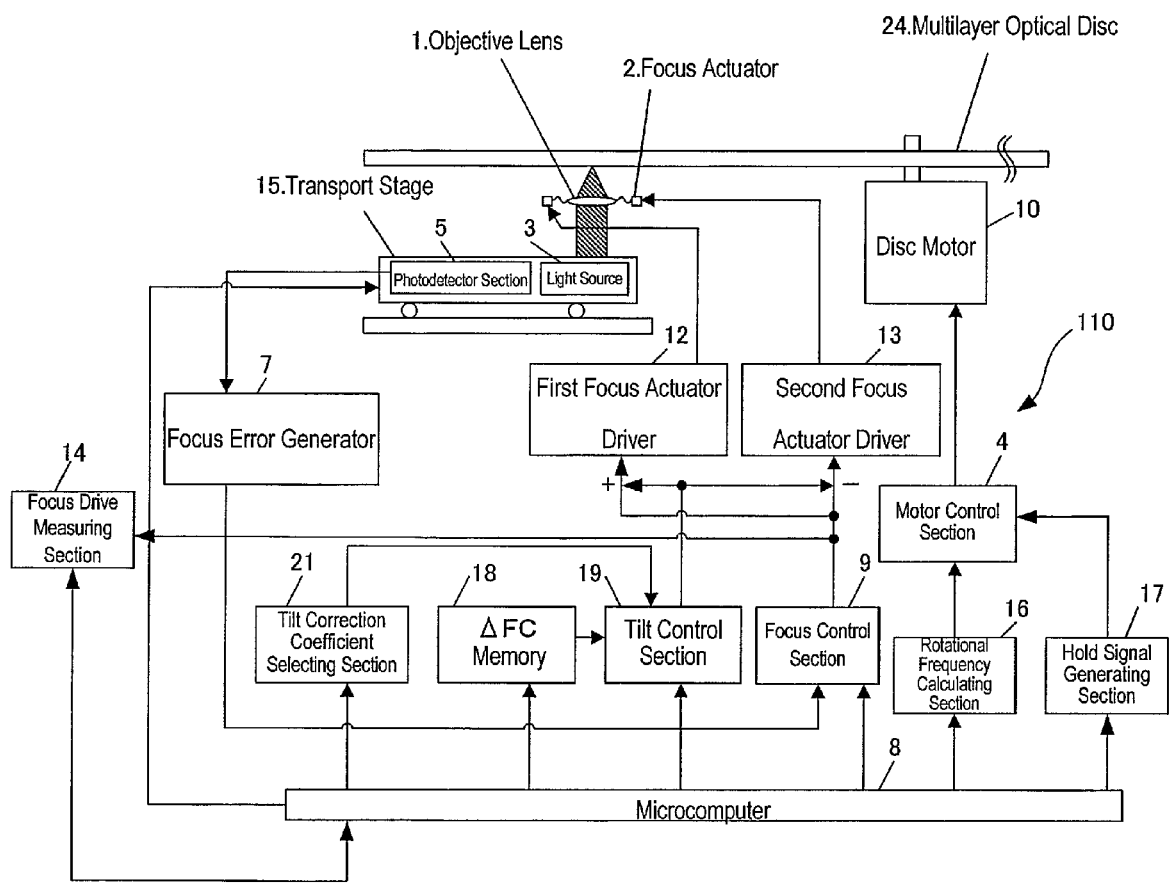
FIG. 9 shows an arrangement of functional blocks in an optical disc drive 110 according to a second preferred embodiment.

FIG. 9 shows an arrangement of functional blocks for an optical disc drive 110 according to the second preferred embodiment. In FIG. 9, any pair of components having substantially the same function as the counterpart of the optical disc drive 100 of the first preferred embodiment is identified by the same reference numeral and the description thereof will be omitted herein.

The optical disc drive 110 of this preferred embodiment includes not only all components of the optical disc drive 100 of the first preferred embodiment but also a tilt correction coefficient selecting section 21. In each of multiple storage layers of a multilayer optical disc, the tilt correction coefficient selecting section 21 stores a coefficient kn (where n is an integer) for converting the tilt quantities of the optical disc and the objective lens and an offset OFSn (where n is an integer) as a pair. In the following description, the coefficient kn and the offset OFSn will be referred to herein as "tilt correction coefficients". The tilt correction coefficient selecting section 21 selects appropriate ones of the tilt correction coefficients stored according to layer information. As used herein, the "layer information" is a piece of information showing on which storage layer of the multilayer optical disc 24 the light beam spot is now located. It is usually one of the storage layers from/on which information is going to be read or written.

Hereinafter, the relation between the tilt quantities of a disc and an objective lens will be described in detail with reference to FIG. 10.

FIGS. 10(a) and 10(b) are schematic representations showing the relation between the tilt of a multilayer optical disc 24 and that of an objective lens 1. Specifically, FIG. 10(a) shows the relation between the optical disc 24 and the objective lens 1 in a situation where the optical disc 24 is not tilted, while FIG. 10(b) shows the relation between the optical disc 24 and the objective lens 1 in a situation where the optical disc 24 is tilted. In the following description, a number of storage layers are supposed to be stacked one upon the other in the multilayer optical disc 24 at a layer-to-layer interval of 5 μm to 70 μm.

Look at FIG. 10(a) first. When the light beam spot is located at a point d1 on a first storage layer 22, the angle θ1 of the objective lens 1 that minimizes the coma aberration at the point d1 and realizes the best read/write performance is supposed to be equal to OFS1.

On the other hand, when the light beam spot is located at a point d2 on a second storage layer 23, the angle θ2 of the objective lens 1 that minimizes the coma aberration at the point d2 and realizes the best read/write performance is supposed to be equal to OFS2.

These offsets OFS1 and OFS2 are determined by the coma aberration produced by the optical system of the optical pickup. Since the offsets are affected by the distance that the incoming light beam has to go through the protective layer of the disc, the angles of the objective lens 1 that realize the best read/write performance on the first and second storage layers 22 and 23 are different from each other.

Look at FIG. 10(b) next. The multilayer optical disc 24 is tilted at an angle θ5. When the light beam spot is located at a point d3 on the first storage layer 22, the angle θ3 of the objective lens 1 that minimizes the coma aberration at the point d3 and that realizes the best read/write performance can be given by $\theta 3 = k1 \cdot \Delta FC + OFS1$.

In this equation, OFS1 is caused by the coma aberration produced by the optical system of the optical pickup as described above, and therefore, is generated as an offset quantity irrespective of the tilt quantity θ5 of the optical disc. On the other hand, since ΔFC is determined so as to be proportional to θ5, $k1 \cdot \Delta FC$ changes proportionally to θ5.

Next, if the multilayer optical disc 24 is tilted at an angle θ5 and when the light beam spot is located at a point d4 on the second storage layer 23, the angle θ4 of the objective lens 1 that minimizes the coma aberration at the point d4 and that realizes the best read/write performance can be given by $\theta 4 = k2 \cdot \Delta FC + OFS2$.

In this equation, OFS2 is also generated as an offset quantity irrespective of the tilt quantity θ5 of the optical disc. On the other hand, since ΔFC is determined so as to be proportional to θ5, $k2 \cdot \Delta FC$ changes proportionally to θ5.

Since k1 and k2 that are coefficients of proportional terms are affected by the distance that the incoming light beam has to go through the protective layer of the disc, the proportionality factors k1 and k2 for the first and second storage layers 22 and 23 have mutually different values.

The coefficient kn and offset OFSn (where n is an integer) described above are objective lens' own coefficients to be set when the objective lens is designed. Specifically, kn is a coefficient for use to convert a focus drive difference, associated with the $n^{th}$ storage layer, into a tilt quantity (i.e., a coma aberration correction sensitivity associated with the $n^{th}$ storage layer). The closer to the objective lens (i.e., the closer to the disc surface) the storage layer is, the smaller the coefficient kn thereof becomes. Both of these coefficients kn and OFSn can be obtained by experiment based on some signal evaluation indices such as jitter and RF amplitude with respect to the tilt quantity of the objective lens that would optimize the signal evaluation indices when the $n^{th}$ storage layer is tilted.

As for this example, a method of setting the lens tilt (i.e., the angle formed by the objective lens) with respect to ΔFC has been described. However, a similar statement applies to the disc tilt quantity Dt, too. In calculating the disc tilt quantity Dt, θ3 and θ4 respectively correspond to:

$$\theta 3' = k1' \cdot Dt + OFS1$$

$$\theta 4' = k2' \cdot Dt + OFS2$$

When the optical disc drive 110 is shipped as a product, the manufacturer stores these values in advance in a memory (not shown) of the tilt correction coefficient selecting section 21. And when the optical disc drive 110 is operated, the tilt correction coefficient selecting section 21 selectively retrieves those values according to the storage layer on which the light beam is now focused, and the tilt control section 19 uses the retrieved values to calculate tilt correction values. In this manner, tilt control can be carried out in view of not only the tilt of the optical disc but also that of the objective lens as well. Since kn and OFSn are affected by variations caused during the manufacturing process, these coefficients may be set for each and every optical disc drive being manufactured and their best values may be stored in the optical disc drive.

Figure 11:
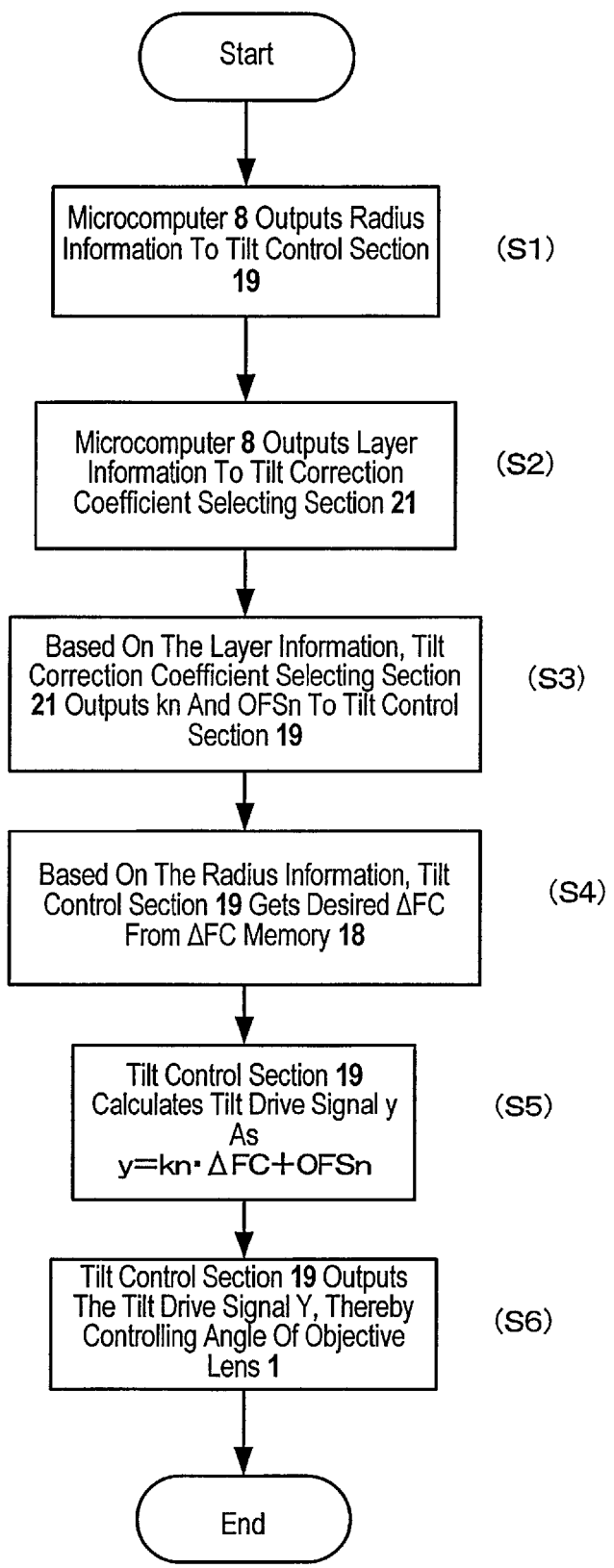
FIG. 11 is a flowchart showing a procedure in which the optical disc drive 110 of the second preferred embodiment measures the tilt.
Figure 12:
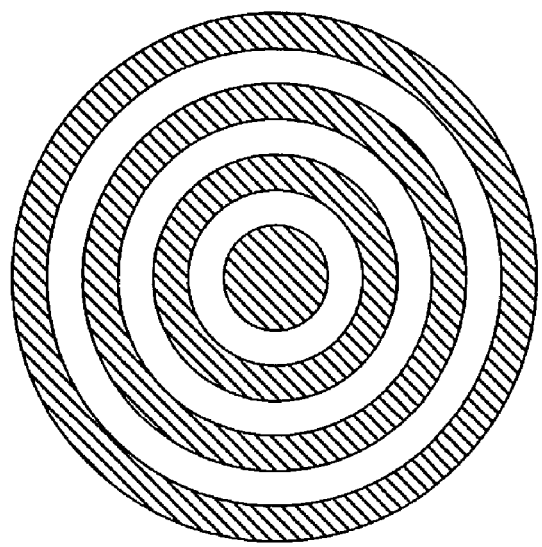
FIGS. 12(a) and 12(b) schematically show cross sections of a light beam on the storage layer of an optical disc in a situation where no tilt has been caused and in a situation where a tilt has been caused, respectively.
Figure 12:
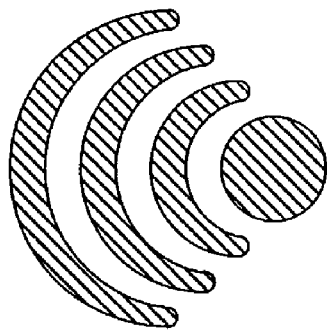
Figure 13:
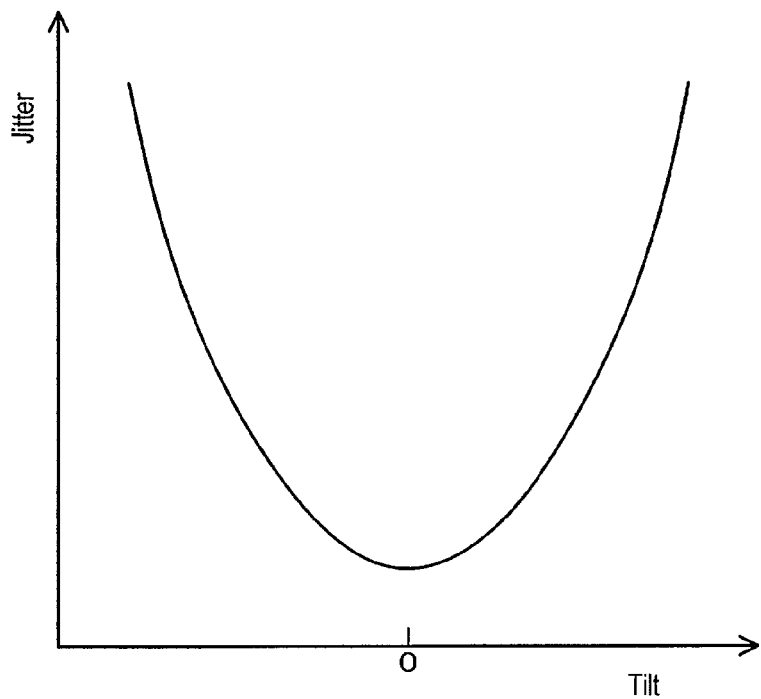
FIGS. 13(a) and 13(b) show how the jitter of a read signal changes with the tilt quantity and how the error rate changes with the tilt quantity, respectively.
Figure 13:
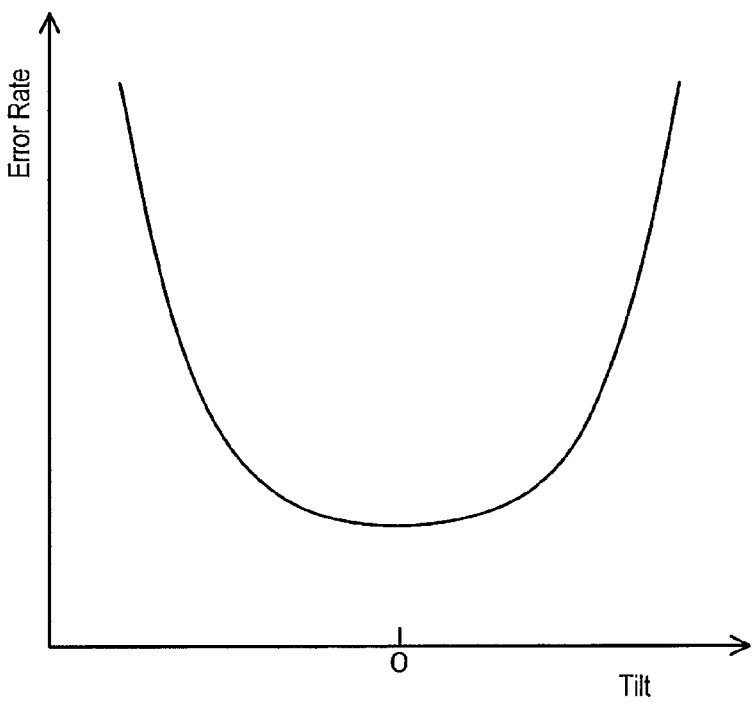

FIG. 11 is a flowchart showing the procedure in which the optical disc drive 110 of this preferred embodiment measures the tilt.

First, in Step S1, the microcomputer 8 determines the radial location on a storage layer of the multilayer optical disc 24, at which the light beam spot is currently located, by the position of the transport stage 15, and outputs radius information to the tilt control section 19. Meanwhile, in Step S2, the microcomputer 8 outputs layer information, showing on which storage layer of the multilayer optical disc 24 the light beam spot is currently present, to the tilt correction coefficient selecting section 21.

Next, in Step S3, in accordance with the layer information provided by the microcomputer 8, the tilt correction coefficient selecting section 21 selects associated kn and OFSn from multiple pairs of coefficients kn (where n is an integer) and offsets OFSn (where n is an integer) stored there and outputs them to the tilt control section 19.

Then, in Step S4, the tilt control section 19 gets a focus drive difference ΔFC associated with the target radial location from the ΔFC memory 6 in accordance with the radius information provided by the microcomputer 8. If the optical disc is rotated by the CLV control or the ZCLV control, ΔFC is obtained by the method that has already been described for the first preferred embodiment.

Thereafter, in Step S5, the tilt control section 19 calculates the tilt quantity y (or tilt drive signal) by substituting the coefficient kn (where n is an integer) and the offset OFSn (where n is an integer) that have been selected by the tilt correction coefficient selecting section 21 into the following Equation (5):

$$y = kn \cdot \Delta FC + OFSn \quad (5)$$

Figure 10:
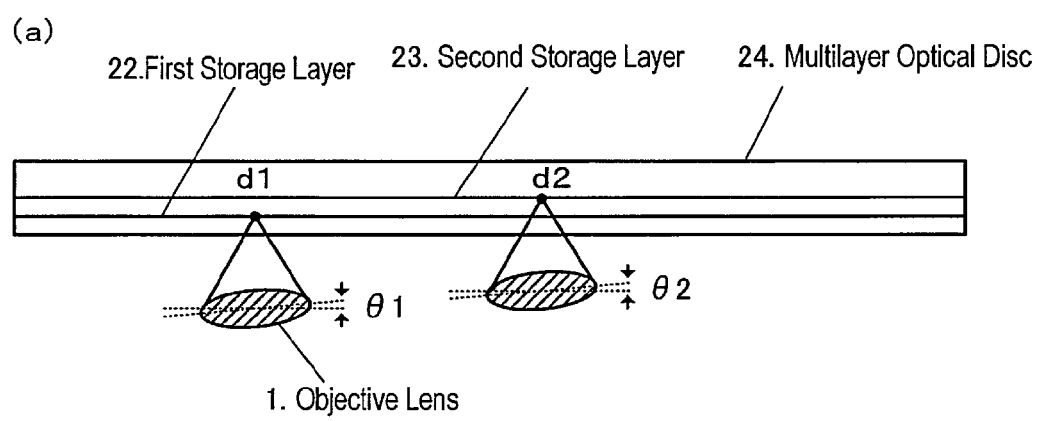
FIGS. 10(a) and 10(b) show a relation between the tilts of a multilayer optical disc 24 and an objective lens 1 in a situation where the optical disc 24 is not tilted and in a situation where the optical disc 24 is tilted, respectively.
Figure 10:
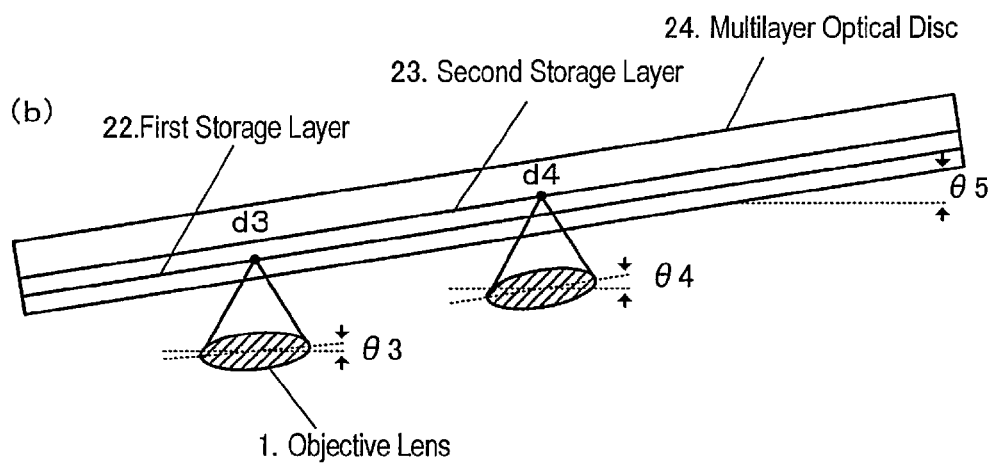

For instance, in the example shown in FIG. 10(*b*), the tilt quantity of the first storage layer 22 is calculated by: y=k1·ΔFC+OFS1 and that of the second storage layer 23 is calculated by: y=k2·ΔFC+OFS2.

Subsequently, in Step S6, the tilt control section 19 outputs the tilt drive signal thus obtained. The tilt drive signal is added to the focus drive signal of the first focus actuator driver 12 and is subtracted from the focus drive signal of the second focus actuator driver 13. That is to say, the tilt control section 19 applies tilt drive signals of mutually opposite polarities to the first and second focus actuator drivers 12 and 13. By driving the objective lens 1 and changing the angles of the objective lens using these tilt drive signals, the tilt angle defined by the optical axis of the light beam irradiating the multilayer optical disc 24 with respect to the surface of the optical disc 24 is changed. As a result, a tilt control is realized so as to control the objective lens 1 such that the coma aberration of the light beam spot on the desired storage layer of the multilayer optical disc 24 is reduced (to zero, for example).

Thus, in a situation where the tilt of an objective lens is controlled with respect to that of an optical disc with multiple storage layers, if the tilt quantity of the disc (i.e., the focus drive difference ΔFC) is measured on at least one of those storage layers, the tilt of the objective lens 1 can be controlled even without measuring the disc tilt quantities of the other storage layers. Thus, there is no need to adjust the best tilt conditions of the objective lens between those storage layers. As a result, a system that has a simplified configuration and yet realizes a high-precision tilt control by performing a measuring process for just a short time can be provided.

It should be noted that the tilt quantity of the disc could be measured on the target storage layer indirectly by measuring the tilt quantity LT of the objective lens 1, which will be the best condition for the read signal, instead of directly measuring the focus drive difference ΔFC. For example, the focus drive difference ΔFC may be calculated indirectly as the disc tilt by the following Equation (6):

$$\Delta FC = (LT - OFSn)/kn \quad (6)$$

where kn is a coefficient for converting a focus drive difference associated with a storage layer into a tilt quantity and OFSn is a predetermined offset associated with the storage layer.

Industrial Applicability

The optical disc drive of the present invention needs no tilt detection sensor and is not affected by a variation in disc height, which is caused by a difference in rotational frequency, while measuring the tilt quantity, and therefore, achieves a high-precision tilt control even in the CLV control mode. As a result, the reliability of the information stored can be increased and the read/write performance of the optical disc drive can be improved.

The invention claimed is:

1. An optical disc drive comprising:
a motor for rotating an optical disc;
an optical system for irradiating the optical disc with a light beam;
a moving mechanism for moving the optical system along the radius of the optical disc;
a focus control section for controlling movement of the optical system perpendicularly to the optical disc, thereby focusing the light beam onto a storage layer of the optical disc; and
a tilt control section for measuring the tilt quantities of the storage layer at multiple different radial locations on the optical disc based on focus drive values for the respective radial locations when the focus control section focuses the light beam there,
wherein when the tilt control section does not measure a tilt quantity, the motor rotates the optical disc at mutually different rotational frequencies at a first radial location and a second radial location that is different from the first radial location, and
wherein when the tilt control section measures a tilt quantity, the motor keeps the rotational frequency of the optical disc constant at both of the first and the second radial locations, and the tilt control section uses a first and a second focus drive values that have been obtained at the first and the second radial locations.

2. The optical disc drive of claim 1, further comprising a tilt driving section for adjusting the angle defined by the optical axis of the optical system with respect to the optical disc,
wherein when the tilt control section measures the tilt quantity,
the motor rotates the optical disc at a rotational frequency associated with one of the multiple different radial locations, and
the tilt control section generates a tilt drive value for reducing the magnitude of coma aberration of a light beam spot on the storage layer of the optical disc based on the tilt quantity measured and supplies the tilt drive value to the tilt driving section.

3. The optical disc drive of claim 1, wherein the optical disc has a resonant rotational frequency at which resonance is produced by rotation, and wherein if the rotational frequency of the optical disc falls within the range of ±10% of the resonant rotational frequency, the focus drive values for the optical system when the focus control section focuses the light beam at the respective radial locations oscillate in a longer period than the period of rotation of the optical disc, and wherein the tilt control section obtains a number of focus drive values at the respective radial locations over a period that is longer than the oscillation period of the focus drive values for the optical system and determines a representative drive value based on the multiple focus drive values obtained.

4. The optical disc drive of claim 3, wherein the tilt control section determines the average of the multiple focus drive values obtained to be the representative drive value.

5. The optical disc drive of claim 1, wherein when the optical disc drive writes information on the optical disc, the optical disc is rotated at a rotational frequency that is associated with a radial location where information starts to be written and the tilt quantity of the storage layer is measured at the same radial location where writing is started.

6. The optical disc drive of claim 1, wherein since the optical disc drive has started to write information on the optical disc and until the optical disc drive finishes writing the information, the optical disc is rotated at a rotational frequency that is associated with a radial location where information will be written next time and the tilt quantity of the storage layer at the same radial location where writing will be resumed next time is measured.

7. The optical disc drive of claim 1, wherein if the tilt control section measures the tilt quantities in multiple areas of the storage layer, the motor keeps the rotational frequency of the optical disc constant in at least two radial locations within the measuring areas but changes the rotational frequencies of the optical disc when the measuring areas are changed.

8. The optical disc drive of claim 1, wherein the optical disc has a resonant rotational frequency at which resonance is produced by rotation, and wherein if the rotational frequency of the optical disc falls within the range of ±10% of the resonant rotational frequency, the tilt control section does not measure the tilt quantity.

9. The optical disc drive of claim 8, wherein the tilt control section calculates the tilt quantities of the optical disc, which is rotating within the range, based on the tilt quantities that have been measured at rotational frequencies outside of the range.

10. The optical disc drive of claim 1, further comprising a housing for enclosing the optical disc airtight when the optical disc is loaded, wherein the housing has no structure that changes a gas flow when the optical disc rotates.

11. An optical disc drive comprising:
a motor for rotating an optical disc;
an optical system for irradiating the optical disc with a light beam;
a moving mechanism for moving the optical system along the radius of the optical disc;
a focus control section for controlling movement of the optical system perpendicularly to the optical disc, thereby focusing the light beam onto a storage layer of the optical disc; and
a tilt control section for measuring the tilt quantities DT of the storage layer at multiple different radial locations on the optical disc based on focus drive values for the respective radial locations when the focus control section focuses the light beam there, wherein the optical disc has at least two storage layers, and
wherein the tilt control section calculates a tilt correction Y for one of the at least two storage layers by changing the values of a set of coefficients a and b in $Y = a \times DT + b$, where a is a coefficient and b is an offset that are defined in advance for each of the two storage layers.

12. The optical disc drive of claim 11, further comprising a coefficient selecting section for storing multiple sets of coefficients a and offsets b that have been set in advance for each of the at least two storage layers and selecting a set of the coefficient a and the offset b that is associated with the storage layer on which the focal point of the light beam is located, wherein the coefficient selecting section supplies the selected set of the coefficient a and the offset b to the tilt control section.

13. An optical disc drive comprising:
a motor for rotating an optical disc;
an optical system for irradiating the optical disc with a light beam;
a moving mechanism for moving the optical system along the radius of the optical disc;
a focus control section for controlling movement of the optical system perpendicularly to the optical disc, thereby focusing the light beam onto a storage layer of the optical disc; and
a tilt control section for measuring the tilt quantities of the storage layer at multiple different radial locations on the optical disc based on focus drive values for the respective radial locations when the focus control section focuses the light beam there, wherein when the tilt control section measures the tilt quantities, the motor keeps the rotational frequency of the optical disc constant and the tilt control section uses the focus drive values that have been obtained at the respective radial locations, and wherein the optical disc has a resonant rotational frequency at which resonance is produced by rotation, and wherein if the rotational frequency of the optical disc falls within the range of ±10% of the resonant rotational frequency, the focus drive values for the optical system when the focus control section focuses the light beam at the respective radial locations oscillate in a longer period than the period of rotation of the optical disc, and wherein the tilt control section obtains a number of focus drive values at the respective radial locations over a period that is longer than the oscillation period of the focus drive values for the optical system and determines a representative drive value based on the multiple focus drive values obtained.

* * * * *